(12) United States Patent
Tang et al.

(10) Patent No.: US 10,962,624 B2
(45) Date of Patent: *Mar. 30, 2021

(54) AUTOMATED SYSTEM FOR VEHICLE TRACKING

(71) Applicant: Capital One Services, LLC, McLean, VA (US)

(72) Inventors: Qiaochu Tang, The Colony, TX (US); Micah Price, Plano, TX (US); Jason Hoover, Grapevine, TX (US); Geoffrey Dagley, McKinney, TX (US); Avid Ghamsari, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/781,600

(22) Filed: Feb. 4, 2020

(65) Prior Publication Data

US 2020/0386845 A1 Dec. 10, 2020

Related U.S. Application Data

(63) Continuation of application No. 16/434,525, filed on Jun. 7, 2019, now Pat. No. 10,591,576.

(51) Int. Cl.
*G01S 5/00* (2006.01)
*G07C 5/00* (2006.01)
*G08G 1/00* (2006.01)
*G06T 7/70* (2017.01)

(52) U.S. Cl.
CPC .............. *G01S 5/0027* (2013.01); *G06T 7/70* (2017.01); *G07C 5/008* (2013.01); *G08G 1/205* (2013.01); *G06T 2207/30244* (2013.01); *G06T 2207/30264* (2013.01)

(58) Field of Classification Search
None
See application file for complete search history.

(56) References Cited

U.S. PATENT DOCUMENTS

| | | | |
|---|---|---|---|
| 9,812,015 B1 * | 11/2017 | Cox | H04W 4/44 |
| 9,964,951 B1 | 5/2018 | Dunn et al. | |
| 10,453,216 B1 * | 10/2019 | Zelenskiy | G06K 9/2063 |
| 2004/0032327 A1 | 2/2004 | Flick | |
| 2004/0160304 A1 | 8/2004 | Mosgrove et al. | |
| 2007/0090921 A1 | 4/2007 | Fisher | |
| 2008/0319664 A1 | 12/2008 | Kremin et al. | |
| 2011/0199479 A1 | 8/2011 | Waldman | |
| 2011/0288891 A1 | 11/2011 | Zaid et al. | |
| 2013/0113936 A1 | 5/2013 | Cohen et al. | |
| 2014/0207629 A1 | 7/2014 | Bradley et al. | |

(Continued)

OTHER PUBLICATIONS

U.S. Pat. No. 10,589,720, Automated System for Car Access in Retail Environment, filed Jun. 7, 2019.

(Continued)

*Primary Examiner* — Fekadeselassie Girma
(74) *Attorney, Agent, or Firm* — Banner & Witcoff, Ltd.

(57) ABSTRACT

Aspects described herein may allow for vehicle tracking. Systems and methods described herein may allow a vehicle to automatically detect the presence of a physical marker at a parking space. An image of the physical marker may be processed to determine the location of the vehicle, which may be stored and/or output for display.

20 Claims, 10 Drawing Sheets

(56) References Cited

U.S. PATENT DOCUMENTS

| | | |
|---|---|---|
| 2014/0336920 A1 | 11/2014 | Burrell et al. |
| 2015/0039365 A1 | 2/2015 | Haque |
| 2015/0066545 A1 | 3/2015 | Kotecha et al. |
| 2015/0095123 A1 | 4/2015 | Wenninger |
| 2015/0179070 A1 | 6/2015 | Sandbrook |
| 2015/0228125 A1 | 8/2015 | Silva |
| 2015/0271164 A1 | 9/2015 | Hamid |
| 2016/0086029 A1 | 3/2016 | Dubuque |
| 2016/0265935 A1 | 9/2016 | Ma |
| 2016/0307047 A1* | 10/2016 | Krishnamoorthy ... G06F 3/0482 |
| 2016/0349062 A1 | 12/2016 | Campan et al. |
| 2017/0116783 A1 | 4/2017 | Huang et al. |
| 2017/0140452 A1 | 5/2017 | Li et al. |
| 2017/0186317 A1* | 6/2017 | Franklin ............... G08G 1/149 |
| 2017/0219361 A1* | 8/2017 | Mays ................ G01C 21/3685 |
| 2017/0343375 A1 | 11/2017 | Kamhi et al. |
| 2018/0005446 A1 | 1/2018 | Elazary et al. |
| 2018/0043777 A1 | 2/2018 | Ishibashi et al. |
| 2018/0154867 A1 | 6/2018 | Golduber |
| 2018/0170256 A1 | 6/2018 | Medenica et al. |
| 2018/0365883 A1 | 12/2018 | Fillhardt et al. |
| 2019/0039567 A1 | 2/2019 | Froitzheim et al. |
| 2019/0050634 A1 | 2/2019 | Nerayoff et al. |
| 2019/0057372 A1 | 2/2019 | Batten et al. |
| 2019/0072390 A1 | 3/2019 | Wang et al. |
| 2019/0107411 A1 | 4/2019 | Gil |
| 2019/0120650 A1 | 4/2019 | Miyake et al. |
| 2019/0137290 A1* | 5/2019 | Levy ................. G01C 21/3461 |
| 2019/0137294 A1 | 5/2019 | Jung et al. |
| 2019/0294889 A1* | 9/2019 | Sriram ................. G06K 9/6274 |
| 2019/0304307 A1* | 10/2019 | Huang .................. G08G 1/017 |
| 2019/0308616 A1* | 10/2019 | Jie ......................... B60W 10/06 |
| 2020/0012829 A1 | 1/2020 | Davidson et al. |

OTHER PUBLICATIONS

U.S. Pat. No. 10,591,576, Automated System for Vehicle Tracking, filed Jun. 7, 2019.

U.S. Appl. No. 16/434,551, Augmented Reality Directions Utilizing Physical Reference Markers, filed Jun. 7, 2019.

U.S. Appl. No. 16/434,580, System and Methods for Test Driving Cars with Limited Human Interaction, filed Jun. 7, 2019.

U.S. Appl. No. 16/748,636, Automated System for Car Access in Retail Environment, filed Jan. 21, 2020.

* cited by examiner

US 10,962,624 B2

AUTOMATED SYSTEM FOR VEHICLE TRACKING

CROSS-REFERENCE TO RELATED APPLICATIONS

The instant application is a continuation of U.S. patent application Ser. No. 16/434,525, titled "Automated System for Vehicle Tracking," and filed Jun. 7, 2019, the disclosure of which is hereby incorporated by reference in its entirety. This application is also related to the following U.S. patent applications, filed on Jun. 7, 2019:
- U.S. patent application Ser. No. 16/434,505, titled "AUTOMATED SYSTEM FOR CAR ACCESS IN RETAIL ENVIRONMENT";
- U.S. patent application Ser. No. 16/434,551, titled "AUGMENTED REALITY DIRECTIONS UTILIZING PHYSICAL REFERENCE MARKERS"; and
- U.S. patent application Ser. No. 16/434,580, titled "SYSTEMS AND METHODS FOR TEST DRIVING CARS WITH LIMITED HUMAN INTERACTION".

The entirety of each of the related applications is incorporated by reference herein for all purposes.

FIELD OF USE

Aspects of the disclosure relate generally to electronic devices. More specifically, aspects of the disclosure may provide for a systems and methods for tracking vehicles.

BACKGROUND

Parking lots for automobiles may be very large and difficult to navigate. Auto dealers may have large amounts of inventory, and may have difficulty identifying where exactly a given vehicle is parked. Systems and methods to better identify where vehicles are parked are needed.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects discussed herein may provide a computer-implemented method for an automated vehicle tracking system. A computing system or server may facilitate automated detection and tracking for a vehicle parking location. For example, in at least one implementation, a system (which may be installed in a vehicle) may determine that a vehicle is parked (e.g., based on detecting a gear shift into mark, a lack of motion for a threshold period of time, or a physical marker in a parking space). The system may capture image data corresponding to a physical marker. The physical marker may comprise a QR code. Information corresponding to the image data may be transmitted (e.g., wirelessly) to a server. The wireless transmission may comprise a transmission from a wireless transceiver (e.g., a cellular transceiver or a Bluetooth transceiver). The server may determine a parking spot based on the information, and record an association between the information and the vehicle. The location of the vehicle may be displayed to the user (e.g., on a display of the vehicle or a mobile device).

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to systems, methods, techniques, apparatuses, and non-transitory computer readable media for test driving vehicles with minimal human interaction. For example, a smart key storage device may be used to store vehicle keys, and may be associated with a computing system or server. The server may communicate with a mobile device of the user and the smart key storage device. The server may communicate with a locking system for a vehicle. The server may communicate location information regarding a vehicle. The mobile device may display the location information using one or more methods. The server, smart key storage device, mobile device, and/or keys may be examples of one or more computing devices. As discussed further herein, this combination of features may allow a user to test drive a vehicle.

Before discussing these concepts in greater detail, however, several examples of a computing device that may be used in implementing and/or otherwise providing various aspects of the disclosure will first be discussed with respect to FIG. 1.

Figure 1:
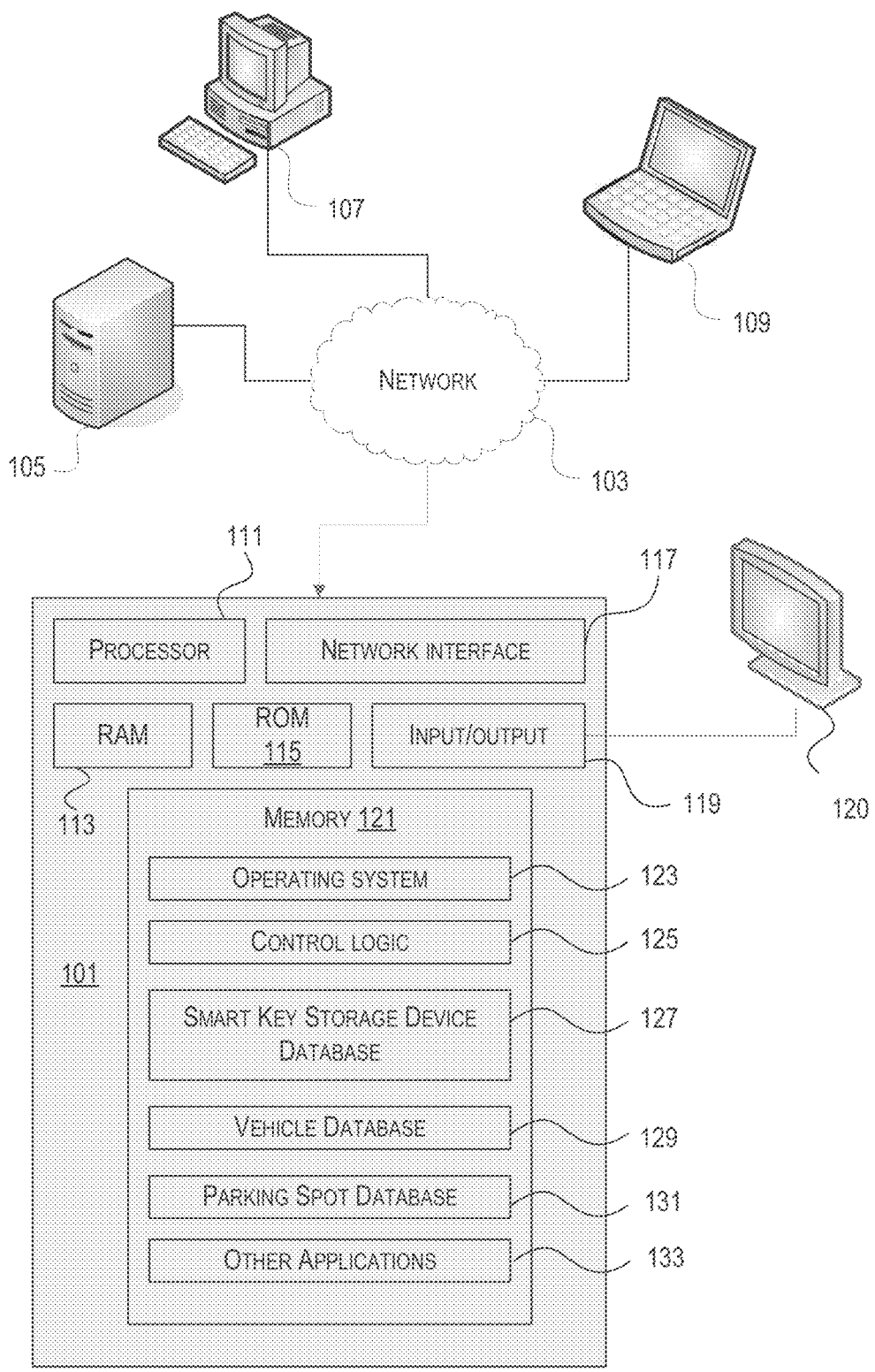
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associating smart key storage devices with vehicle keys, tracking the status of vehicle keys based on sensor data received from the smart key storage devices, generating vehicle access for a user (e.g., for a test drive), tracking vehicle locations, calculating directions to/from a vehicle, and other functions. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein. Furthermore, memory 121 may store various databases and applications depending on the particular use, for example, smart key storage device database 127, vehicle database 129, parking spot database 131, and other applications 133 may be stored in a memory of a computing device used at a server system that will be described further below. Control logic 125 may be incorporated in and/or may comprise a linking engine that updates, receives, and/or associates various information stored in the memory 121 (e.g., smart key storage device identifiers, vehicle and vehicle key identifiers, locking information, statuses, location information, directional information, etc.). In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to an illustrative environment and network for test driving vehicles with minimal human interaction.

Figure 2:
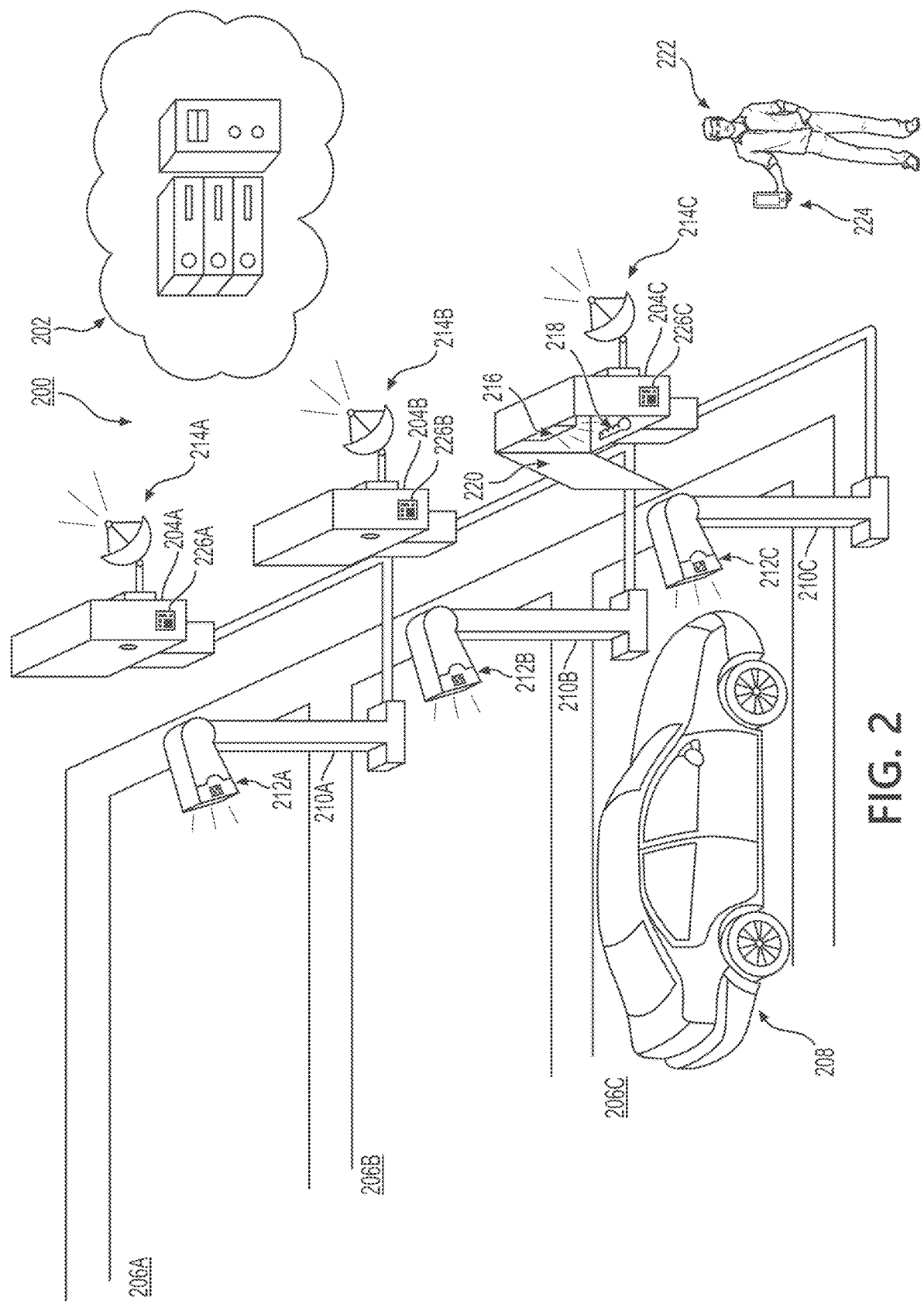
FIG. 2 depicts an example environment in accordance with one or more illustrative aspects discussed herein.

FIG. 2 depicts an example environment 200 in accordance with one or more illustrative aspects discussed herein. In at least one aspect, a user 222, via a mobile device 224, may be able to test drive a vehicle 208 with minimal human interaction. For example, the user 222 may send a request to test drive a desired vehicle 208. In various embodiments, "test drive" may be further used to refer to the act of driving a vehicle in order to test the vehicle before a rental, lease, or purchase agreement. The request may be inputted into an application running on mobile device 224 and may be sent to a remote or local server 202. The user 222 may be given instructions that the desired vehicle is parked at a specific parking spot 206C. Also or alternatively, the user 222 may visually survey various vehicles parked in a plurality of parking spots 206A-206C (other vehicles not shown), and choose to test drive one of the vehicles (e.g., vehicle 208). The user 222 may be given instruction, e.g., via an application running on mobile device 224 and hosted and/or managed by a server 202, to access a vehicle key 218 for the desired vehicle 208 from a vehicle key storage device 204C. Smart key storage devices 204A-204C may be located adjacent to and/or in front of parking spots 206A-206C. The smart key storage device may comprise a compartment, container, storage facility, or similar apparatus ("storage compartment") having an entry that can be locked or unlocked. The entry be a door, lid, chute, and/or other panel ("storage door") that could be electronically locked or unlocked to deny or allow access to contents within the storage compartment. A key, key fob, remote, or electronic device for accessing a vehicle ("vehicle key") may be a content that can be stored in the storage compartment of the smart key storage device. While referred to as a "vehicle key" for simplicity, it is to be understood that the vehicle key need not be restricted to conventional mechanical keys but may also include electronic devices, remotes, key fobs, and other means for accessing a vehicle.

The instructions to access a vehicle key from a specified smart key storage device may be given by server 202. The server may also provide and/or equip the smart key storage devices 204A-204C with unlock instructions. For example, an unlock instruction may include an instruction to unlock a door, lid, chute, and/or other panel ("storage door") to the storage compartment 220 of the smart key storage device 204A-204C (e.g., in response to an unlock request signal sent by the mobile device 224). The unlock request signal may be a near field communication (NFC) signal sent by the mobile device 224 to a NFC receiver on the smart key storage device. The unlock instruction may include an instruction to unlock the storage door to the storage compartment 220 of the smart key storage device 204A-204C if the mobile phone registers and/or captures a physical marker 226A-226C (e.g., RFID tag) on the smart key storage device. After registering or capturing the physical marker 226A-226C, the mobile device 224 may relay a signal to the server 202, which may inform the smart key storage device 204A-204C to unlock. The server 202 may track the status of each smart key storage device 204A-204C via their respective wireless transceivers 214A-214C.

A user 222 desiring to test drive vehicle 208 parked in parking spot 206C may register or capture the physical marker 226C of the adjacent smart key storage device 204C. An identifier (e.g., RFID) may be captured from the physical marker 226C by a sensor (e.g., scanner, camera, etc.) on the mobile device 224, and the sent to the server 202. The server may then allow the smart key storage device corresponding to the scanned physical marker (e.g., smart key storage device 204C) to unlock its storage door, allowing the user 222 to access the vehicle key 218 that is stored in the storage compartment. The vehicle key 218 may also have a physical marker that is detectable by a key sensor 216 in the storage compartment. In some aspects, the storage compartment may be designed to prevent random contents from being stored, other than vehicle keys.

The key sensor 216 may be located within the storage compartment of the smart key storage device. The key sensor 216 may detect that the vehicle key 218 has been removed or placed and may update the server 202 of the removal or placement. The key sensor 216 may also detect the presence of the key and update the server 202 accordingly. Information regarding a vehicle key's placement, removal, or presence in a smart key storage device may be used by the server to update the status of the smart key storage device or the vehicle key, or form an association between the smart key storage device and the vehicle key. Furthermore, the key sensor may be capable of detecting a physical marker on the vehicle key.

Thus, the key sensor 216 may comprise one or more sensors that can detect motion and/or proximity, or can capture an image (e.g., to detect a physical marker). For example, the key sensor 216 may be a proximity sensor that emits an electromagnetic field or beam, or an ultrasound field or beam, on to the storage compartment and detect changes in the field or return signal. The presence of a vehicle key 218 may cause the sensor to detect a significant change in the field or return signal. In another example, the key sensor 216 may comprise a motion sensor that uses changes in image capturing to detect a removal or placement of a vehicle key. Furthermore, the key sensor 216 may capture an image of the vehicle key and detect a physical marker from the captured image.

As described above, in some implementations, a physical marker may be located on the smart key storage device, the vehicle key, the vehicle, and/or near a parking space. The physical marker may be stationary (e.g., a sticker having a fixed barcode) or dynamic (e.g., an electronic display, such as an e-ink display, configured to display a barcode). A dynamic physical marker may be updated or changed, e.g., by the server 202.

In at least another illustrative aspect, a vehicle 208 may be able to determine the relative location of a parking spot (e.g., parking spot 206C). The vehicle 208 may comprise an image sensor. For example, an image sensor may be present in an autonomous or semi-autonomous driving system, such as a lane-monitoring system installed on the front of the vehicle. In another example, an image sensor may be a mobile unit installed in the vehicle, such as camera module adhered to a windshield (e.g., a dash cam). In yet another example, an image sensor may be a mobile device, such as a phone, that is tethered to the vehicle. Physical markers 212A-212C may be installed at parking spot systems at, adjacent to, or associated with each parking spot 206A-206C. One or more image sensors may scan, read, or capture data from the physical markers 212A-212C. The image sensors may be located within a vehicle that can be parked in the corresponding parking spot, or may be located within the mobile device 224. In order to allow a vehicle's image sensor to scan, read, or capture data from physical markers 212A-212C with ease, the physical markers 212A-212C may be appropriately positioned to face the vehicle, e.g., via stands 210A-210C. A location sensor (not shown) in the parking spot system may transmit locational information of the parking spot so that the user 222 can be informed of the location of the user's vehicle 208.

In at least another illustrative aspect, a user 222 may be able to locate and obtain directions to the user's vehicle 208. The server 202 may authenticate the user 222 via the user's mobile device 222, and/or may determine a vehicle 208 associated with the user 222. The server may obtain the vehicle's location, e.g., from a location sensor. The server 202 may guide the user 222 using an augmented reality (AR) application on the user's mobile device 224.

In at least another illustrative aspect, a user 222 may be able to lock or unlock the user's requested vehicle 208 via the user's mobile device 224. The server 202 may authenticate the user 222 via the user's mobile device 224 and determine a vehicle 208 associated with a request by the user 222. The association may be based on data obtained by the mobile device 224 from a physical marker on the vehicle 208. Also or alternatively, the server may track the vehicle during its use by the user 222, e.g., from location sensors in the vehicle. A vehicle unlock may be correlated with a user location. For example, a user 222 may request to test drive a vehicle using the mobile device 224. The server 202 may unlock the vehicle 208 after confirming that the location of the mobile device 224 is within a proximity of the vehicle 208 and/or parking spot 206C.

Figure 3:
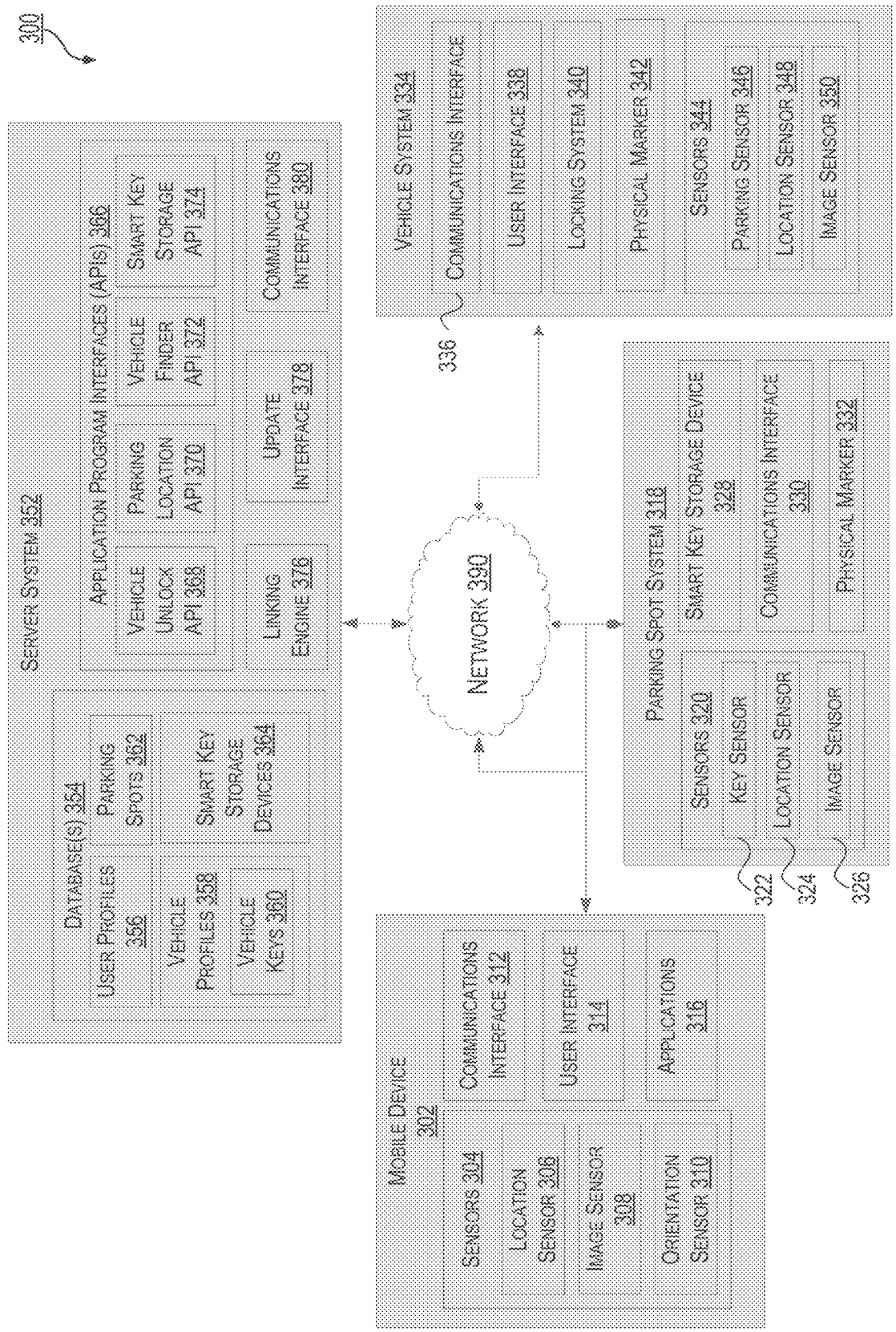
FIG. 3 depicts an example network in accordance with one or more illustrative aspects discussed herein.

FIG. 3 depicts an example network 300 in accordance with one or more illustrative aspects discussed herein. Each component or subcomponent shown in FIG. 3 may be implemented in hardware, software, or a combination of the two. Additionally, each component or subcomponent may include a computing device (or system) having some or all of the structural components described above for computing device 101. At a high level, the network 300 may include, for example, one or more mobile devices (e.g., mobile device 302), one or more parking spot systems (e.g., parking spot system 318), one or more vehicle systems (e.g., vehicle 334), and one or more server systems (e.g., server system 352). The mobile device 302 (e.g., a "user device") may comprise a mobile phone (e.g., smartphone), personal computer, tablet computer, laptop, or the like, which may include at least some of the features described herein. The mobile device 302 may belong to a user seeking to utilize systems and methods described herein, and may be used to send requests to and/or receive notifications from server system 352, e.g., via an application and/or program hosted, managed, and/or otherwise controlled by the server system 352. For example, the mobile device 302 may be used to request access to a smart key storage device, such as smart key storage device 328, to be able to remove a stored vehicle key to test drive a vehicle, such as the vehicle associated with vehicle system 334. The mobile device 302 may be a computing device distinct from the parking spot system 318, or the server system 352.

According to some aspects of the disclosure described herein, the mobile device 302 may comprise one or more components or features described below. Through a communications interface 312, the mobile device may be able to form wired and/or wireless data connections with other computing systems and devices, such as the one or more components of the parking spot system 318, the vehicle 334, and the server system 352, as described further below, via an internet and/or other telecommunications network (e.g., network 390). The mobile device 302 may include various sensors 304 configured to capture physical data (e.g., from physical markers); collect locational, geographical, and/or movement information; and/or transmit data. For example, the mobile device 302 may comprise a built-in or connected image sensor 308 (e.g., a camera, a scanner, etc.) that may scan and/or generate image and/or video data. A user may operate image sensor 308 to capture image and/or video data including a physical marker associated with parking sport system 318 and/or vehicle system 334, for example, a linear barcode, a matrix (2D) barcode (e.g., Aztec Code, augmented reality (AR) code, data matrix, quick response (QR) code, etc.) associated with a device and/or system. The sensors 304 within the mobile device may further include one or more orientation sensors 310 (e.g., gyrometer, solid-state gyroscope, accelerometer, compass, etc.) to measure a measure acceleration, direction, and/or rotation of the vehicle. Furthermore, the sensors 304 may include a location sensor 306 (e.g., global positioning system (GPS)) to determine a location of the mobile device. Other types of sensors may also be downloaded as applications 316. The mobile device 302 may also store user-specific identifying information within its memory (not shown), which can be accessed by or sent to the server 352, e.g., as metadata.

The user interface 314 may be a display coupled with input devices (e.g., keyboard, type pad, touch screen, mouse, buttons, icons, microphone, sensors, etc.) that allows a user to send requests, input information and/or view information. For example, the user interface 314 may allow a user to send a request to the server system 352 to test drive a vehicle near the user. The user interface 314 may then display instructions to the user to interact with a smart key storage device to access a vehicle key to test drive the vehicle. The mobile device 302 may also run programs or applications 316 on a user interface 314. One application or program may enable a user to use the systems and methods described herein to test drive a vehicle with limited human interaction. The application or program may be provided to the user device or hosted by server 352 (e.g., via an application program interface (API) 366). In some implementations, the mobile device 302 may include one or more subcomponents of computing device 101, shown in FIG. 1.

The parking spot system 318 may include one or more devices, computing systems, or sensors at, adjacent to, or associated with a parking spot of a vehicle. The parking spot system 318 may include one or more of the features and components described below. The parking spot system 318 may include various sensors 320 configured to capture physical data (e.g., from a physical marker on mobile device 302 or on a vehicle parked in a vehicle spot at, adjacent to, or associated with the parking spot system 318); collect locational or geographical information (e.g., via location sensor 324); track the presence, absence, removal, or replacement of keys (e.g., via key sensor 322); and/or transmit sensor data. For example, the parking spot system 318 may include an built-in or affixed image sensor 326 (e.g., a camera, a scanner, etc.) that may scan and/or generate image and/or video data. These data may include, for example, a linear barcode, a matrix (2D) barcode (e.g., QR code, AR code, etc.). Thus, a user may present a mobile device with a downloaded or displayed physical marker to the image sensor 326 so that the image sensor can capture or register a requisite image or video data (e.g., linear barcode, matrix barcode, etc.). In some implementations, as a vehicle is being parked into a parking spot at, adjacent to, or otherwise associated with the parking spot system 318, the image sensor 326 may be able to detect a physical marker on the vehicle.

The parking spot system 318 may comprise a smart key storage device 328, and a communications interface 330 to establish wireless, wired, or network connections with one or more other systems (e.g., the mobile device 302, the server system 352, the vehicle systems 334, etc.) The smart key storage device 328 may be a compartment, container, storage facility, or similar apparatus ("storage compartment") having an entry that can be locked or unlocked. The entry may be a door, lid, chute, and/or other panel ("storage door") that could be electronically locked or unlocked to deny or allow access to contents within the storage compartment. A key, key fob, remote, or electronic device for accessing a vehicle ("vehicle key") may be a content that can be stored in the storage compartment of the smart key storage device 328. As described above, it is to be understood that the vehicle key need not be restricted to conventional mechanical keys but may also include electronic devices, remotes, key fobs, and other means for accessing a vehicle. The vehicle key and the smart key storage device 328 may each have their own unique identifiers. For example, a first identifier may correspond to the smart key storage device and a second identifier may correspond to the vehicle key. An association between the specific smart key storage device and a specific vehicle may be formed using their respective identifiers at the server system 352. The key sensor 322 may be located within the smart key storage device 328 and may track the presence, absence, removal, and/or replacement of the vehicle key within the storage compartment. The key sensor 322 may be an electronic device that transmits radio signals to the storage compartment to monitor whether an object is present. Also or alternatively, the key sensor 322 may be an image sensor that reads or detects an identification on a vehicle key (e.g., a linear barcode, a matrix barcode, etc.). Also or alternatively, the key sensor 322 may be an RFID reader that reads or detects radio frequency emitted by the vehicle key. Upon detection of a presence and/or replacement of a vehicle key in the storage compartment, the key sensor 322 may recognize that the detected vehicle key is a correct vehicle key via a determination that an identification of the vehicle key (e.g., an RFID, linear barcode, matrix barcode, etc.) matches an identification of the vehicle key that is associated with the smart key storage device 318. The determination of whether the detected vehicle key is the correct vehicle key, and the association may occur at the server system 352. Sensor data from the key sensor 318 may thus be sent to the server system 352 via a network 390.

The parking spot system 318 may further comprise a physical marker 332. The physical marker 332 may be a linear barcode (e.g., universal product code (UPC)), matrix barcode (e.g., QR code, AR code, etc.), or an RFID tag. The physical marker 332 may be utilized by a scanner, image sensor, and/or reader, e.g., on the mobile device 302 or the vehicle. For example, a user seeking to obtain a vehicle key from the smart key storage device 328 may be instructed to present scan, capture, and/or register the physical marker 332 (e.g., a QR code) using an image sensor 308 of the mobile device 302. The image sensor may be used by an application 316.

The vehicle 334 may include one or more devices, computing systems, circuitry or sensors that are interior to, exterior to, or otherwise associated with a vehicle. The parking spot system 318 may include one or more of the features and components described below, according to some aspects of the present disclosure. For example, the vehicle 334 may include various sensors 334 configured to capture a state of the vehicle (e.g., parking sensor 346); collect locational or geographical information (e.g., location sensor 348); scan, read, or capture image or video (e.g., image sensor 350); and/or transmit sensor data. For example, a parking sensor 346 may detect when a vehicle is being parked or is in a "parked" state. The parking sensor 346 may be an accelerometer that recognizes a vehicle parking based on a change in acceleration of a component of the vehicle (e.g., that the vehicle has ceased movement for a threshold time). Also or alternatively, the parking sensor 346 may be an image sensor reading when an indicator for parking is turned on, or a sensor (e.g., an ODBII-compatible sensor) that detects a change in a mechanical structure of the vehicle (e.g., brakes, clutch, etc.) as the vehicle is parked. The vehicle 334 may include a location sensor (e.g., a global positioning service (GPS)) to capture and present a location of the vehicle. In some implementations, the vehicle 334 may include an image sensor 350 that scans, reads, or captures a physical marker at a parking spot (e.g., physical marker 332 of the parking spot system 318), as the vehicle parks or approaches the parking spot. From data captured from the physical marker 332, the image sensor 350 may allow the server system 352 to determine the locational information of the parking spot. For example, the server system 352 may have a list of known locations associated with identifiers and other data captured by sensors from physical markers. As discussed herein, there may be a physical marker located on one or more of the parking spot system (e.g., physical marker 332), the vehicle key, or the vehicle system 334 (e.g., physical marker 342), according to some aspects of the present disclosure.

Additionally or alternatively, the vehicle may include a physical marker, e.g., physical marker 342, which may comprise a linear barcode, matrix barcode, RFID tag, etc. Thus, in some aspects, a user could rely on an image sensor 326 of the parking spot system 318 to scan a physical marker on the vehicle (e.g., physical marker 342), rather than use the mobile device's image sensor 308 to scan a physical marker 332 of the parking spot system 318. Thus, the parking spot system 318 may comprise an image sensor 326 that may scan the physical marker 342 to determine if/where the vehicle 334 is parked. This may be an alternative to the vehicle 334 recording the physical marker 332, such as may be described in FIG. 6. The physical marker may be stationary (e.g., a sticker having a fixed barcode) or dynamic (e.g., an electronic display configured to display a barcode). For example, a dynamic physical marker may be updated or changed by the vehicle 334 and/or by one or more external systems (e.g., mobile device 302, parking spot system 318, server system 352, etc.). In some implementations, a sensor 320 from the parking spot system 318 (e.g., image sensor 326) or a sensor 304 from the mobile device 302 may scan, read, and/or capture data from physical marker 342. For example, an electronic sensor from the mobile device 302 may capture data from the physical marker 342 on the vehicle, and cause the vehicle to unlock or lock. The vehicle 334 may include a locking system 340 that can electronically and/or mechanically cause the vehicle to unlock or lock based on signals received, e.g., from the mobile device 302.

The vehicle 334 may also include a user interface to allow a user (e.g., a test driver such as user 222) to view sensor data (e.g., location, vehicle state, parking spot information, etc.) received from the above-described sensors, or communicate with external systems. The vehicle 334 may send information to or receive information from other systems (e.g., the mobile device 302, the parking spot system 318, the server system 352, etc.) over a network 390, via communications interface 336. The communications interface 336 may comprise a wireless communications interface, such as a cellular connection (e.g., LTE, 5G), a Wi-Fi connection (e.g., Wi-Fi 5 or Wi-Fi 6), or a Bluetooth tether to a mobile device 302.

The server system 352 may comprise one or more remote, local, and/or connected computing systems or servers managing one or more functions of the above-described systems (e.g., the mobile device 302, the parking spot system 318, the vehicle 334, etc.) to facilitate methods and systems described herein. For example, in some implementations, server 352 may be connected to the parking spot system 318. At a high level, the server system may comprise one or more databases 354, application program interfaces (APIs) 366, a linking engine 376, an update interface 378, and a communications interface 380. The update interface 378 and linking engine 376 may form a database management application, software, or plug-in that may be used to perform create, read, update, or destroy (CRUD) functions with respect to data stored in the one or more databases 354. For example, the linking engine 376 may be used to form associations or link suitable data from different databases together, and/or to create new data based on associations or linkages. The update interface 378 may be used to update databases (e.g., by adding or deleting) data stored in the one or more databases 354 based on instructions from other parts of the server system 352 (e.g., computer readable instructions stored in memory of an API) or information received from one or more external systems (e.g., the mobile device 302, the parking spot system 318, the vehicle 334, etc.). The server system 352 may send information to or receive information from the external systems over a network 390 via communications interface 336.

The server system 352 may include one or more databases described below. For example, the server system 352 may include a database of user profiles 356, which store identifying or biographical information pertaining to a user. The user profile may be based on or associated with an identifier of a mobile device of the user (e.g., mobile number, device identifier, etc.).

Also or additionally, the sever system 352 may include a database of known parking spots 362, e.g., based on a geographic region. For example, the database of parking spots 362 may store identifiers of parking spots within a predetermined distance from a designated address or location. The address or location may be based on the location of a user, which can be found using a location sensor, e.g., of the mobile device 302 or of the vehicle system 334. Thus, a database of parking spots 362 for the example environment illustrated in FIG. 2 may include identifiers of parking spots 206A-206C.

Also or additionally, sever system 352 may include a database of vehicle profiles 358. The vehicle profiles may identify vehicles, e.g., by vehicle identification numbers, license plate numbers, and/or or other vehicle descriptors. In some examples, a vehicle may be identified based on an identifier of its vehicle key (e.g., a vehicle key ID). The list of vehicles may depend on the systems and methods for which the server 352 is being utilized. For example, the vehicle profiles database 358 may identify vehicles that one or more users may test drive with limited human interaction based on systems and methods described herein. In some implementations, the server 352 may include a database for vehicle key IDs 360, and this database may be a part of the database of vehicle profiles 358 (as shown) or as a separate database. The database of vehicle key IDs 360 may list vehicle key IDs for vehicles, e.g., that a user can test drive with minimal human interaction. Furthermore, the database may list a status for each vehicle key, e.g., whether the vehicle key is stored within the smart key storage device, whether it has been removed by a user, etc.

Also or additionally, the sever system 352 may include a database for smart key storage devices 364, which may identify smart key storage devices by unique identifiers. The list of smart key storage devices may be based on a geographic region, or may be independent of its geographic location. For example, the identifiers for the smart key storage devices may be manually stored, and the smart key storage devices may be tracked over a network 390. The database for the smart key storage devices 364 may indicate a status for each smart key storage device, e.g., whether a vehicle key is stored, whether the vehicle key is correct, whether the storage door is open. Furthermore, the location of each smart key storage device may be tracked (e.g., via location sensor 324) and stored in the database 364. As will be described further, in conjunction with FIGS. 4A-4C, the linking engine 376 may be used to generate associations between vehicle key IDs stored in database 360 with identifiers for smart key storage devices stored in database 364. Various information (e.g., identifiers for keys, vehicles, etc.) may be associated with a user profile. The user profile may be based on or associated with an identifier of a mobile device of the user (e.g., mobile number, device identifier, etc.).

The server system 352 may include one or more APIs described below. The server system 352 may include, e.g., an API for an application for unlocking vehicles using a mobile device (e.g., vehicle unlock API 368), an API for an application for tracking a parking location using a parking sensor (e.g., parking location API 370), an API for an application for finding a vehicle using a mobile device (e.g., vehicle finder API 372), and/or an API for an application for test driving a vehicle with minimal human interaction using a smart key storage device (e.g., smart key storage API 374).

Figure 4A:
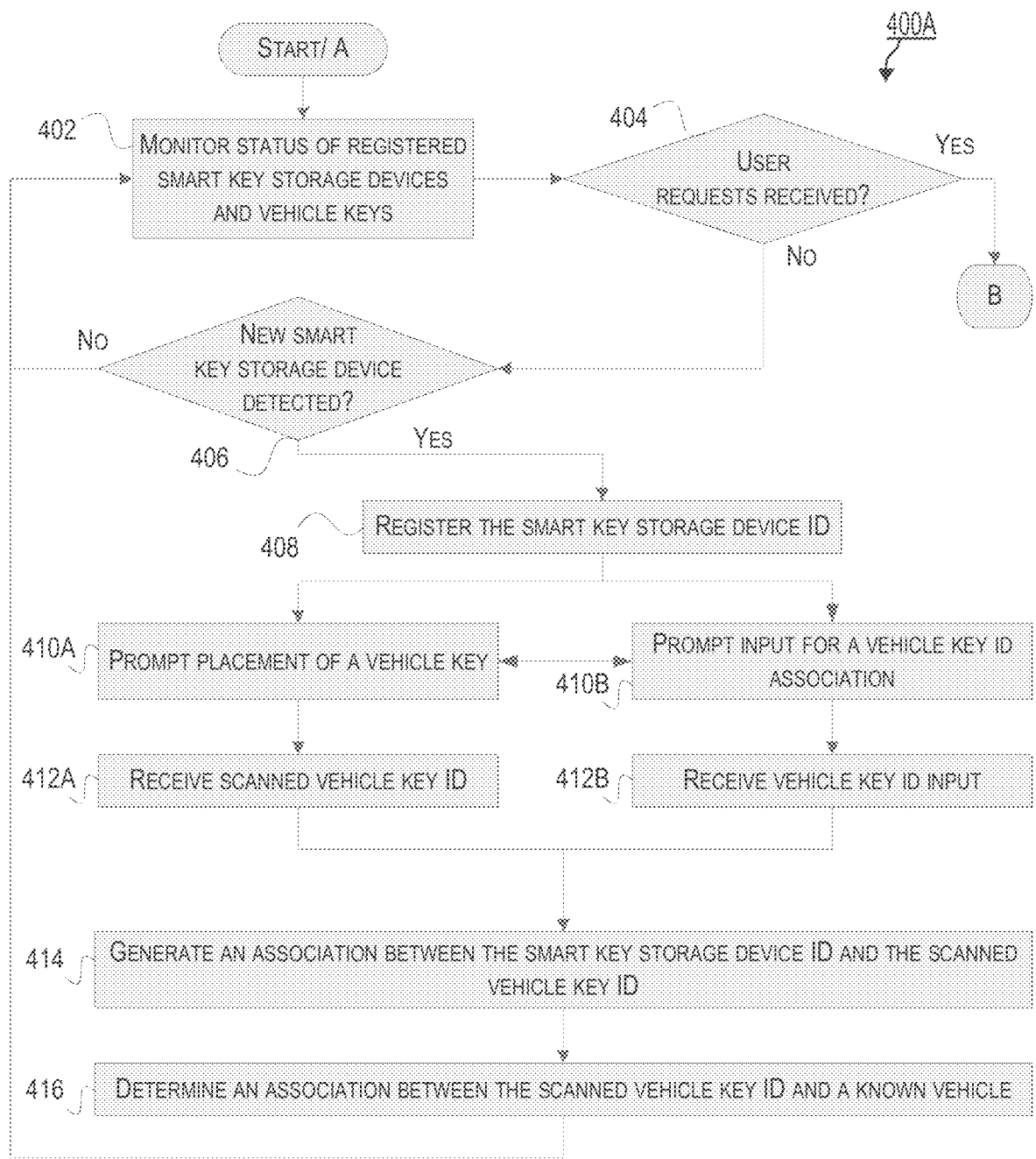
FIGS. 4A-4C depict a flow diagram of an example method for facilitating a test driving of a vehicle with limited human interaction, in accordance with one or more illustrative aspects discussed herein.
Figure 4B:
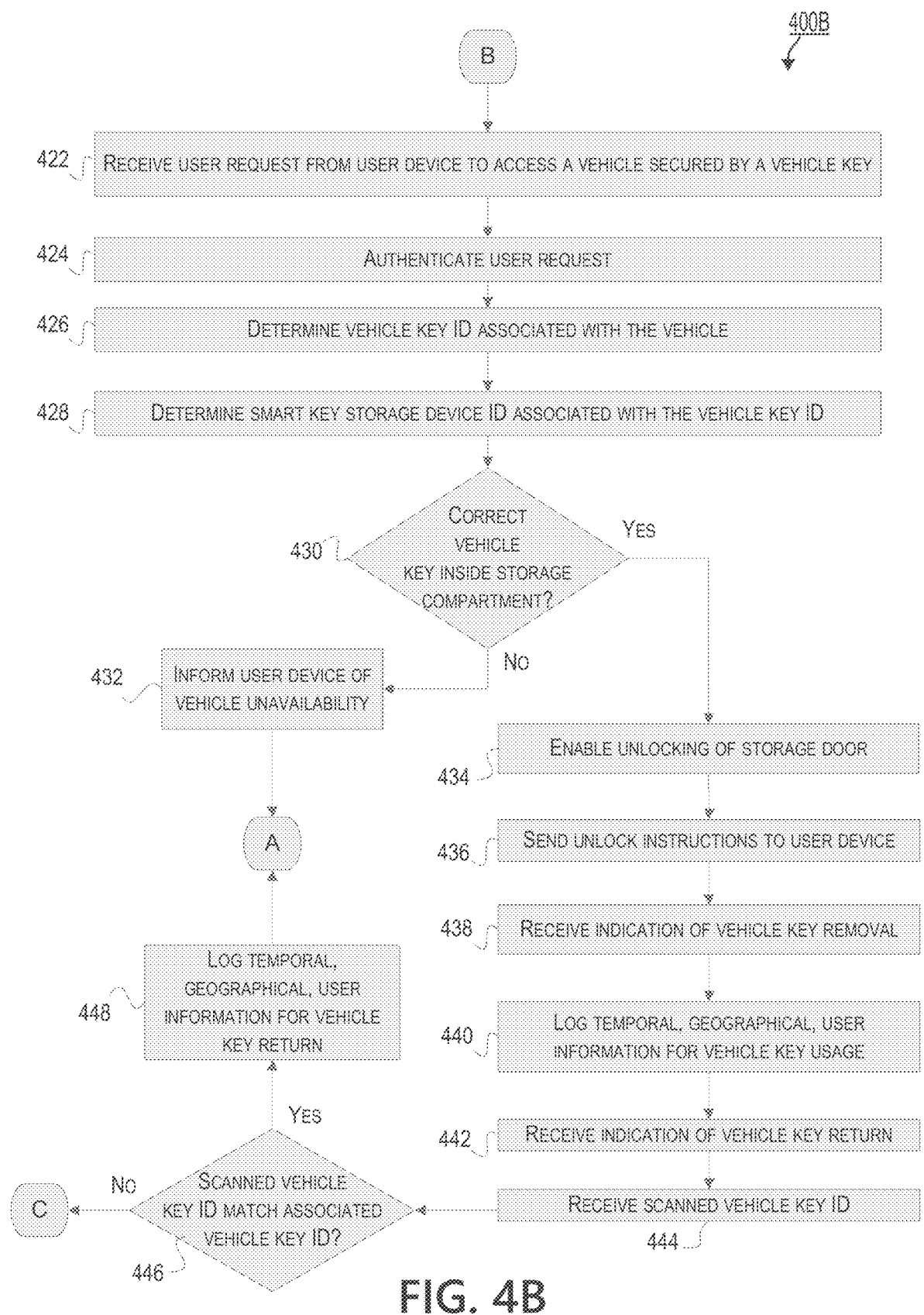
Figure 4C:
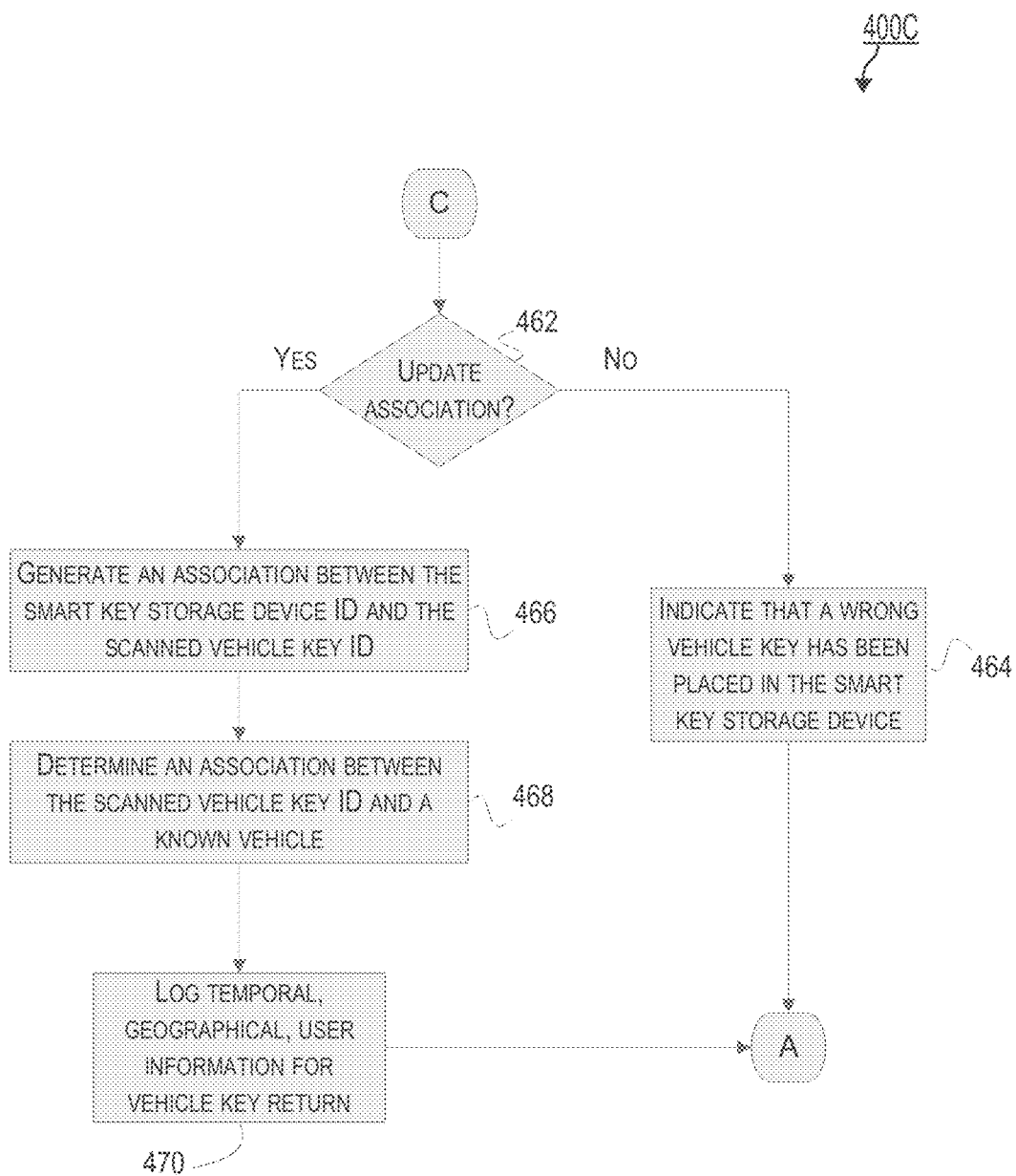

FIGS. 4A-4C depict flow diagram of an example method for facilitating a test driving of a vehicle with limited human interaction, in accordance with one or more illustrative aspects discussed herein. Specifically, FIG. 4A shows a first portion 400A of the method and is related to registering smart key storage devices and vehicle keys and monitoring their status. FIG. 4B shows a second portion 400B of the method and is related to processing and facilitating a user request to test drive a vehicle with limited human interaction, and managing the return of a vehicle key. FIG. 4C shows a third portion 400C of the method and is related to processing the return of a "wrong" vehicle key in a smart key storage device, and generating a new association between a smart key storage device and a vehicle key. The method, portions of the methods, and/or steps may be performed by a server or computing system tasked with facilitating the test driving of a vehicle with limited human interaction ("server") (e.g., computing device 101, server 202, server system 352).

Referring now to FIG. 4A, at step 402, a server may run routine operations of monitoring the status of its various registered smart key storage devices and vehicle keys until at least an external event occurs—e.g., the server detects or receives an unregistered smart key storage device, the server receives a user request to access a vehicle for a test drive with limited human interaction. The server may comprise, for example, computing device 101, server 202, and/or server system 352. As described above, a smart key storage device, such as smart key storage device 328, may comprise a storage compartment having a storage door that could be electronically locked or unlocked to deny or allow access to contents within the storage compartment. A vehicle key, such as vehicle key 218, may be stored in the storage compartment of the smart key storage device. A sensor within the smart key storage device, such as key sensor 322, may scan the vehicle key and identify a unique identifier of the vehicle key ("vehicle key ID"). Furthermore, the smart key storage device may also have its own unique identifier ("smart key storage device ID"). Registration of a smart key storage device may signify that the smart key storage device is known and identifiable to the server, e.g., via the smart key storage device ID. Information between the smart key storage device and the server can be exchanged, e.g., via a wired or wireless network. Registration may further signify that statuses concerning the smart key storage device (e.g., its association to a vehicle key ID, whether that vehicle key is stored or has been removed, etc.) may be stored and updated, e.g., at the database for smart key storage devices in the server.

The monitoring of the status at step 402 may involve, for each smart key storage device identified by its smart key storage device ID, the status of its storage door (e.g., whether it is locked or unlocked, the date or time of its locking and unlocking, etc.), whether or not content is stored within the storage compartment, an identity of the content stored (e.g., vehicle key ID), whether the content matches an associated vehicle key, a user identification connected with the usage of a stored or associated vehicle key ID, geographical and/or temporal information of the smart key storage device 328 or the vehicle key, etc.

After or alongside its routine operations for monitoring the status of its registered smart key storage devices and vehicle keys, the server may determine, at step 404, whether it has received a pending user request to access a vehicle to test drive with limited human interaction. If the server did receive such a request, and if this request is pending (e.g., the request has not been fulfilled), the server may proceed to method portion 400C, as depicted in FIG. 4C, for processing and facilitating a user request to test drive a vehicle with limited human interaction, and managing the return of a vehicle key. At step 406, the server may determine whether the server has detected an unregistered smart key storage device. While FIG. 4A shows that the server may perform the determination at step 406 if there is no pending user request at step 404, the server may also perform step 406 prior to or concurrently with step 404, as part of its routine operations. Unless the server has received a pending user request, or an unregistered smart key storage device 328 has been detected, the server may continue to monitor the status of its registered smart key storage devices and/or vehicle keys (e.g., as in step 402).

The server may detect an unregistered smart key storage device 328 manually or automatically. For example, a user may input information pertaining to an unregistered smart key storage device (e.g., its smart key storage device ID, network ID, etc.) for the server to detect and register the smart key storage device in subsequent device. Also or alternatively, the smart key storage device may be detected by a server within its network, and the smart key storage device ID may be obtained and a connection may be established.

At step 408, if the server detects an unregistered smart key storage device, the server may register the smart key storage device ID. The registration may involve setting up, within a database for smart key storage devices, storage space for information pertaining to the detected smart key storage device. For example, the registration may set up storage space within the database for smart key storage devices 364 within server system 352. Information stored here may be added, deleted, queried, updated, and/or replaced via smart key storage device ID. The information may include a status of the smart key storage device, its storage door, or its storage compartment, as described above.

Furthermore, the registration may further include associating a vehicle key ID to the smart key storage ID. The smart key storage device ID may be associated with a vehicle key ID in one or more ways. For example, an unregistered smart key storage device may be requested to be registered at the server, e.g., manually. At step 410A, the server may prompt a system user that is manually registering the smart key storage device to place a vehicle key in the storage compartment of the smart key storage device. The system user may refer to an individual or group desiring to install, augment, manage, and/or otherwise maintain the described systems for facilitating the test driving of vehicles with limited human interaction. The system user may be different from a user who requests to test drive a vehicle using the described systems. The vehicle key may be one that the system user would like to associate the smart key storage device with. As the vehicle key is placed within the storage compartment of the smart key storage device, a sensor of the smart key storage device (e.g., key sensor 322) may scan the vehicle key and capture, read, or receive a vehicle key ID. For example, the vehicle key ID may comprise or may be received from a physical marker on the vehicle key. The physical marker may be a barcode on the vehicle key that an image sensor may capture, read, or receive. At step 412A, the server may receive the vehicle key ID from the smart key storage device.

Also or alternatively, at step 410B, the server may prompt the input of the vehicle key ID. For example, a computing device (e.g., of the server, smart key storage device, or a mobile device of the system user requesting to register the smart key storage device) may have a user interface enabling the input of the vehicle key ID. After the input, at step 412B, the server may receive the vehicle key ID.

At step 414, the server may generate an association between the smart key storage device ID and the scanned and/or inputted vehicle key ID. The associated vehicle key ID may thus be saved at or linked to the storage space of the smart key storage device ID (e.g., at smart key storage devices 364 within server system 352). Also or alternatively, the server may store a repository of known vehicle key IDs, e.g., in the database of vehicle key IDs 360 within server system 352. The linking of the vehicle key ID and the smart key storage ID may be performed via a linking engine, such as linking engine 376. As will be described further, in conjunction with method portion 400C shown in FIG. 4C, the association of a vehicle key ID to a smart key storage device ID may be replaced with an association with a different vehicle key ID, if desired.

Furthermore, the server may determine an association between the vehicle key ID and a known vehicle, e.g., based on the vehicle key ID. For example, the vehicle key ID may be a vehicle identification number (VIN) that the server may use to look up a known vehicle, e.g., via a stored look-up table or external database. The known vehicle associated with the vehicle key ID may also be saved, e.g., in the vehicle profiles database. The linking engine may thus link the vehicle key ID to the known vehicle, and the vehicle key ID to the smart key storage device ID, accordingly. After successfully registering a smart key storage device, and/or after associating the smart key storage device with a vehicle key, via their respective identifiers, the server may commence its routine operations of monitoring the statuses of its registered smart key storage devices and/or vehicle keys (e.g., as in step 402).

As described above, FIG. 4B shows a second portion of the method for facilitating a test driving of a vehicle with limited human interaction portion. Method portion 400B, shown in FIG. 4B relates to processing and facilitating a user request to test drive a vehicle with limited human interaction, and managing the return of a vehicle key. If the server determines, at step 404 of method portion 400A, that there is a pending user request to access a vehicle to test drive with limited human interaction, the server may perform example method portion 400B shown in FIG. 4B.

At step 422, the server may receive the pending user request from a mobile device of a user (e.g., mobile device 302) to access a vehicle secured by a vehicle key. As described above, the user may be able to select a desired vehicle for test driving via an application on the user's device, and send a request to be able to test drive with limited human interaction. The sent request may be an electronic signal that may be placed in a queue of pending requests. Pending requests may be taken out of the queue as they are fulfilled (e.g., after a user has successfully returned the vehicle keys of the vehicle that the user has requested to test drive).

At step 424, the server may initially authenticate the user request received in step 422. For example, the server may validate that the mobile device being used to send the request is one that the server recognizes (e.g., a mobile device that has agreed to a set of terms or rules as may be prescribed). As another example, the server may validate that the user is not using the request via the mobile device 302 for a fraudulent purpose. Authentication information (e.g., a password, a fingerprint, or any other information that may be used to verify the identity of the user) may be received by the mobile device, processed, and sent to the server. Furthermore, the authentication process may involve seeking permissions for the user to be able to test drive a vehicle with limited human interaction. The mobile device may comprise or may be used to access a user profile of the user. The user profile may indicate information for the user such as credit worthiness, purchasing power, criminal history, and/or other such information that may be used to determine if the user is qualified for a vehicle. One or more methods for authentication is described in steps 505 and 510 in FIG. 5.

After a user request has been authenticated, step 426 may include determining a vehicle key ID associated with the vehicle that the user desires to test drive. As discussed above, the server may comprise a database of known vehicles linked or associated with unique vehicle key IDs, which may have its own database. The server may look up or retrieve the vehicle key ID linked or associated with the vehicle from these databases.

At step 428, the server may determine the smart key storage device ID associated with the vehicle key ID. Like step 426, the server may search through its databases (e.g., database of smart key storage devices 364, vehicle keys database 360, etc.) and linked data to retrieve this smart key storage device ID associated with the vehicle key ID. The vehicle key ID may be based on generated associations between smart key storage device IDs and vehicle key IDs during the registration process of the smart key storage device (e.g., as described in method portion 400A shown in FIG. 4A). After receiving the smart key storage device ID, the server may be able to identify the smart key storage device that may have the vehicle key to allow the user to test drive the desired vehicle. However, it may be possible for the smart key storage device associated with the vehicle key of the desired vehicle to not have the vehicle keys inside its storage compartment. It may also be possible for the smart key storage device to have the wrong vehicle key inside its storage compartment, e.g., a vehicle key that is not the vehicle key associated with the smart key storage device, or have no vehicle keys inside its storage compartment.

Thus, at step 430, the server may determine whether the correct vehicle key is inside the storage compartment of the smart key storage device. A vehicle key may be the correct vehicle key if its vehicle key ID is associated with the smart key storage device ID of the smart key storage device in which the vehicle key is currently stored. The determination may be based on sensor data previously obtained from a key sensor within the smart key storage device (e.g., key sensor 322). As previously described, the key sensor may comprise one or more sensors that may detect the presence of, removal of, placement of, and/or a physical marker on the vehicle key. Thus, at step 430, the server may look up the smart key storage device ID or the vehicle key ID of the desired vehicle in various databases to determine, from its status, whether the correct vehicle key is stored within the smart key storage device.

If the correct vehicle key is not inside the storage compartment of the associated smart key storage device, the server may inform the mobile device, at step 432, that the desired vehicle is unavailable for a test drive. The user may receive and view a notification, e.g., on an application running on the mobile device 302, that informs the user that the desired vehicle in unavailable. As the pending user request cannot be fulfilled due to the unavailability of the correct key, the pending user request may be taken out of the queue, and the server may continue its routine operations of monitoring its registered smart key storage devices and vehicle keys, as described in method portion 400A shown in FIG. 4A. The user may be prompted to pick another vehicle to test drive (e.g., by sending another user request to test drive a vehicle) or prompted to wait until another user returns the vehicle keys for the desired vehicle.

Alternatively, the server may determine, e.g., by looking up the relevant databases or by receiving sensor data from the smart key storage device, that the correct vehicle key is inside the storage compartment of the smart key storage device.

If so, the server may enable, at step 434, the unlocking of the storage compartment. The unlocking can be enabled in various methods involving the server, storage door, and/or the mobile device. For example, at step 442, the server may send an unlock instruction to the mobile device. The unlock instruction may be by way of an unlock code or a physical marker for the mobile device to access.

For example, the user may view the unlock code on the user's mobile device (e.g., on the user interface 314 of the application 316 of mobile device 328). The user may enter the unlock code in the smart key storage device (e.g., by pressing numerical pins or buttons) to unlock the storage door to the storage compartment that stores the vehicle key to the desired vehicle.

Also or alternatively, the server may send a physical marker to the mobile device. The user may retrieve and display the physical marker on the user's mobile device (e.g., on user interface 314 from the application 316 of mobile device 328). The physical marker may be a linear barcode or a matrix barcode (e.g., QR code, AR code, etc.) The user may display physical marker within the field of view of a reader, scanner or image sensor of the smart key storage device (e.g., a bar code reader) to unlock the storage door to the storage compartment that stores the vehicle key to the desired vehicle. The reader, scanner, or image sensor may be different from the sensor used to detect the presence of or capture the vehicle key ID of the vehicle key.

Also or alternatively, the server may cause the display of a physical marker on the smart key storage device. The physical marker may be temporarily displayed, e.g., for a predetermined duration of time, so as to prevent unauthorized users from obtaining entry. The server may instruct the user, via the mobile device, to scan the physical marker displayed on the smart key storage device via an image sensor on the mobile device. The image sensor may be a camera that could feed an image or video of the physical marker to the server. In some aspects, an application on the user's mobile device (e.g., application 316) may automatically activate a camera for the user to capture an image or video of the physical marker. Upon receiving the image or video of the physical marker, the server may electronically unlock the storage door of the smart key storage device by sending a signal to the smart key storage device over a network.

Also or alternatively, the server may directly communicate with the smart key storage device and cause the storage device to unlock via an electronically propagated signal, thus obviating the involvement of the mobile device.

After the storage door to the storage compartment of the smart key storage device has been unlocked, the user may obtain the vehicle key. The user may use the vehicle key to test drive the desired vehicle. As the user removes the vehicle key from the storage compartment, a key sensor within the storage compartment may detect the removal of the vehicle key. For example, the key sensor may comprise a proximity sensor, which emits an electromagnetic or an ultrasound field or beam and notices a change in the return signal. Also or alternatively, the key sensor may comprise an image sensor that typically scans and recognizes a physical marker on the vehicle key. After the vehicle key is removed, the image sensor may miss the detection of the physical marker, and the missed detection may be relevant data sent to the server. Thus, at step 438, the smart key storage device may send, and the server may receive, the sensor data indicating the removal of the vehicle key, and the server may receive the indication of the vehicle key removal.

At step 440, the server may log temporal, geographical, and/or user-specific information pertaining to the usage of the vehicle key. The information may be stored, e.g., in the database for smart key storage devices 364, vehicle keys database 360, and/or vehicle profiles database 358. For example, the server may locate, via the vehicle key ID, the data fields pertaining to the vehicle key obtained by the user. Within the data fields of the vehicle key database, the server may indicate a status that the vehicle key 218 has been checked out and the server may enter the date, time, and/or geographical location of the checking out. The server may also enter an identifier of the user (e.g., the mobile number of the mobile device 302, the user's driver license number, the mobile device 302 identification number, etc.) into the data fields. Also or alternatively, the server may locate, via the smart key storage device ID, the data fields pertaining to the smart key storage device accessed by the user. Within the data fields of the database of the smart key storage devices, the server may indicate a status that associated vehicle key has been removed and the server may enter the date, time, and/or geographical location of the removal. The server may also enter an identifier of the user (e.g., the mobile number of the mobile device 302, the user's driver license number, the mobile device 302 identification number, etc.) into the data fields. Furthermore, various data entries may be linked across different databases, via linking engine 376.

After a user has made use of the vehicle key, e.g., to test drive a desired vehicle associated with the vehicle key, the user may return the vehicle to the smart key storage device. For example, the user may use the unlock instruction provided in step 436 to unlock the storage door of the smart key storage device and place the vehicle key back in the storage compartment of the smart key storage device. Also or alternatively, the user may send a request to the server to unlock the storage door and the server may wirelessly send a signal to the smart key storage device to unlock the storage door for the user to place the vehicle key. The user may be instructed to return the key at the same smart key storage device from which the user had removed the key to test drive the vehicle. Presumably, the smart key storage device may be located next to, in front of, and/or otherwise in proximity to an assigned parking spot for the vehicle. It is contemplated, however, that the user could accidentally or deliberately return the vehicle key at a different smart key storage device. For example, the user may have forgotten the location of the parking spot from which the user picked up the vehicle, and may return the vehicle at a different parking spot and return the vehicle key at a different smart key storage device. Furthermore, in some aspects, where the system allows for associations between a smart key storage device and a vehicle key to be readily updated, the user may be able to return the vehicle key at a different smart key storage device. Therefore, if a "wrong" key is placed in a compartment, the system may be updated to register that key with the compartment. This aspect may confer the advantage that a dealership can allow a vehicle to be moved from one parking spot to another parking spot, without having to necessarily track the location of the vehicle. The system may infer the location of the vehicle, based on the placement of the vehicle key in a compartment adjacent to the parking spot in which the vehicle is returned.

After a user places the vehicle back in the storage compartment of the smart key storage device, one or more sensors of the key sensor (e.g., proximity sensor, image sensor, etc.) may detect the presence of the vehicle key again. At step 442, the smart key storage device may send, and the server may receive, the sensor data detecting the presence of the vehicle key 218. The server may interpret the sensor data as an indication of a return of a vehicle key. However, the server may need to confirm that the returned vehicle key is the same vehicle key that the user had obtained from the smart key storage device to test drive the vehicle. Thus, the key sensor of the storage compartment may also scan the vehicle key to capture, retrieve, and/or read the vehicle key ID of the vehicle key, and the smart key storage device may send the sensor data to the server. In some aspects, the vehicle key ID and the indication of a presence of a vehicle key may be sent concurrently and/or as one set of signals to the server.

At step 444, the server may receive the scanned vehicle key ID. However, at step 446, the server may determine whether the scanned vehicle key ID matches the vehicle key ID that is associated with the smart key storage device. The scanned vehicle key ID may match the vehicle key ID associated with the smart key storage device ID, e.g., if the user that obtained the keys after step 436 returned the vehicle key to the same smart key storage device. If the scanned vehicle key ID matches the associated vehicle key ID, the server, at step 448, may log temporal geographical, and/or user-specific information pertaining to the return of the vehicle key. The information may be entered into data fields into the appropriate databases (e.g., in the database for smart key storage devices, vehicle keys database, and/or vehicle profiles database) and the data fields may be linked accordingly. Thereafter, the server may continue its routine operations of monitoring its registered smart key storage devices and vehicle keys, as described in method portion 400A shown in FIG. 4A.

However, the associated vehicle key ID may not match the scanned vehicle key ID. For example, another user (different from the user that obtained the vehicle key from the smart key storage device 328 after step 436) could have returned a different vehicle key to the smart key storage device after test driving a different vehicle. The server may be configured, e.g., by a system user, to allow users to return vehicle keys in any smart key storage device. Thus, the server may determine, based on the preset configuration, whether to update the associated vehicle key for the smart key storage device so that the new associated vehicle key would be the vehicle key that has been placed in the smart key storage device, as described in method portion 400C of FIG. 4C.

As mentioned above, FIG. 4C depicts a third portion of the method for facilitating a test driving of a vehicle with limited human interaction. Method 400C, shown in FIG. 4C, relates to processing the return of a "wrong" vehicle key in a smart key storage device, and generating a new association between a smart key storage device 328 and a vehicle key. Depending on how one would like to utilize the systems described herein for facilitating the test driving of a vehicle with limited human interaction, the systems may or may not be configured to allow smart key storage devices to form new associations ("update associations") with vehicle keys and replace their previous associations. If a smart key storage device is configured to allow an association to be updated, a user need not return the vehicle key to the same smart key storage device from which the user had obtained the vehicle key. Thus, aspects described in method portion 400C show that there may not necessarily be a "wrong" vehicle key in a smart key storage device, but rather just a vehicle key that has not yet been associated with the smart key storage device in which the vehicle key is place in. At least some aspects of method portion 400C may allow a user to return a vehicle to a different parking spot than the one from which the user retrieved the vehicle, and place the vehicle keys in a different smart key storage device than the one from which the user retrieved the vehicle key. As the vehicle key gets scanned at the different smart key storage device by a key sensor, the server may be able to track the vehicle with which the vehicle key is associated and deem the vehicle as being safely returned.

After the placement of a vehicle key at a smart key storage device that is not associated with the vehicle key, the server may determine, at step 462, whether the smart key storage device has been configured to allow its association to be updated (e.g., "update association?"). If the smart key storage device does not allow for its association to be updated, the server, at step 464, may cause the smart key storage device to indicate that a wrong vehicle key has been placed in the smart key storage device. For example, the smart key storage device may display a light (e.g., a blinking red light to signify rejection), an audio signal, and/or a text to indicate that the wrong vehicle key has been placed. Also or alternatively, the smart key storage device may indicate that it is the wrong smart key storage device for the vehicle key. The indication may prompt the user that placed the vehicle key to remove it and place it in the correct smart key storage device. Nevertheless, or thereafter, the server may continue its routine operations of monitoring its registered smart key storage devices and vehicle keys, as described in method portion 400A of FIG. 4A.

If the smart key storage device is configured to update its current association with its vehicle key (e.g., "Update association?"=Yes), the server, at step 466, may generate a new association between the smart key storage device ID and the scanned vehicle key ID of the vehicle key that is currently stored in the smart key storage device.

At step 468, the server may determine an association between the vehicle key ID of the vehicle key stored within the smart key storage device and a known vehicle, e.g., based on the vehicle key ID. For example, the vehicle key ID may be a vehicle identification number (VIN) that the server may use to look up a known vehicle, e.g., via a stored look-up table or external database. The known vehicle associated with the vehicle key ID may also be saved, e.g., in the vehicle profiles database 358. A linking engine (e.g., linking engine 376) may thus link the vehicle key ID to the known vehicle, and the vehicle key ID to the smart key storage device ID, accordingly.

At step 470, the server may log temporal geographical, and/or user-specific information pertaining to the return of the vehicle key. The information may be entered into data fields into the appropriate databases (e.g., in the database for smart key storage devices 364, vehicle keys database 360, and/or vehicle profiles database 358, etc.) and the data fields may be linked accordingly. Thereafter, the server may continue its routine operations of monitoring its registered smart key storage devices and vehicle keys, as described in method portion 400A of FIG. 4A.

Figure 5:
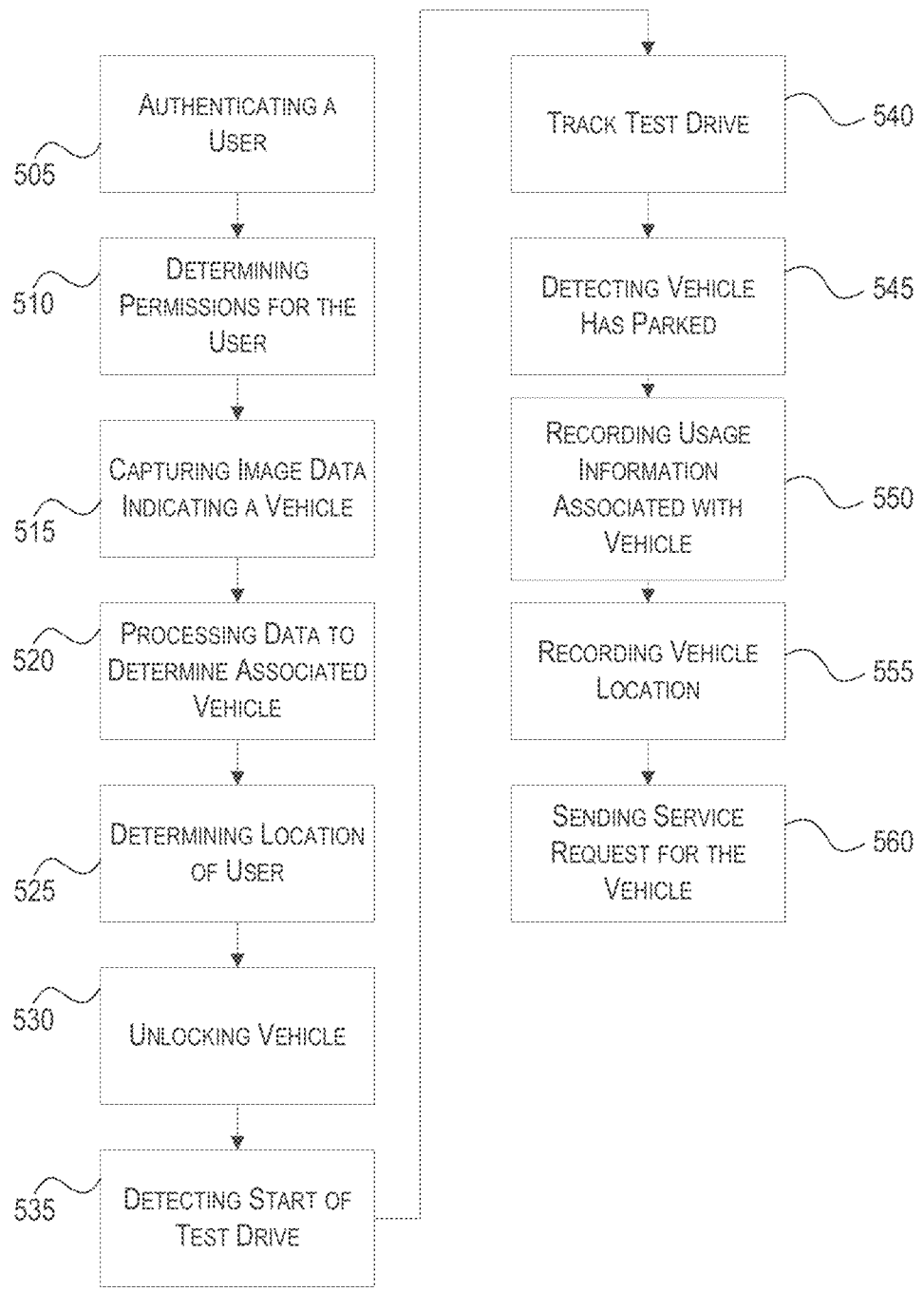
FIG. 5 depicts a flow diagram of an example method for facilitating automated vehicle access in a retail environment in accordance with one or more illustrative aspects discussed herein.

Having discussed a method for facilitating a test driving of a vehicle with limited human interaction as shown in FIGS. 4A-C, discussion will now turn to a method for facilitating automated vehicle access as shown in FIG. 5.

FIG. 5 illustrates an example method for facilitating automated vehicle access in a retail environment. The method may utilize modern technology to provide a user with access to a vehicle (e.g., vehicle 334) without the need for an in-person salesman, while managing inventory and vehicle access. Modern vehicles may employ systems (e.g., vehicle systems 334) that provide electronic access to vehicle locks (e.g., locking system 340). By identifying a user that is authorized to access the vehicle, and by confirming that the user is in proximity to the vehicle, a server (e.g., server 352) may send a command to unlock the vehicle so that the user can go for a test drive. The server may track the progress of the test drive, and/or determine when the test drive has ended, based on feedback from the vehicle. An application (e.g., application 316) of a mobile device (e.g., mobile device 302) may facilitate a user accessing the vehicle, and may provide feedback regarding the test drive to the server.

At step 505, the system may authenticate a user (e.g., a user 222). The user may be a user who wishes to view a vehicle (e.g., a vehicle 208, which may employ vehicle systems 334) for purchase. For example, the user may have entered a car lot, and may be looking at one or more vehicles to purchase. The user may access an application (e.g., application 316) to obtain a list of available vehicles for lease or purchase. The application may obtain the list from the server, which supply a list of inventory within a predetermined proximity of the mobile device. Authentication information (e.g., a password, a fingerprint, or any other information that may be used to verify the identity of the user) may be received by a mobile device, processed, and sent to the server.

At step 510, the system may determine permissions for the user. For example, the server may comprise user profile information associated with the user (e.g., user profiles 356). The user profile information may indicate information for the user such as credit worthiness, purchasing power, criminal history, or other such information that may be used to determine if the user is qualified for a vehicle. In some instances, the user may be pre-qualified, and a notice of pre-qualification may be sent to the user (e.g., in an email advertisement) to come look at a vehicle. Permissions for the user may be determined for multiple vehicles (e.g., a class of vehicles). Permissions may be determined as needed (e.g., determined for a particular vehicle after step 525).

At step 515, the system may capture image data indicating a vehicle (e.g., vehicle 334). A mobile device (e.g., mobile device 302) may capture (e.g., using an image sensor 308), a physical marker (e.g., physical marker 332) corresponding to the vehicle. The physical marker may comprise a matrix barcode (e.g., QR code, AR code, etc.), as discussed above. The mobile device may display a prompt to a user to take an image of the matrix barcode. A user may input a code (e.g., an alphanumeric code written on the physical marker) on the mobile device using a user interface (e.g., user interface 314). The mobile device may capture image data of the vehicle itself (e.g., one or more images of the vehicle, which may be used to determine the vehicle).

In some instances, a parking spot system (e.g., parking spot system 318) may capture image data. The mobile device may display an image, such as a QR code or barcode. A user may hold the mobile device up to an image sensor (e.g., image sensor 326), so that the parking spot system may detect the image. If the parking spot system scans an image of the mobile device, the server may determine a user associated with the mobile device, and determine whether to grant access to a vehicle known to be associated with physical marker (e.g., consistent with the systems and methods described herein).

At step 520, the system may process the image data to determine the vehicle. The mobile device may process data locally, and/or the mobile device may transmit data to the server to be processed remotely. An image of a physical marker could be processed to determine an indicator that may correspond to an entry for the vehicle in a database (e.g., vehicle profiles 358). For example, the mobile device may detect a QR code, transmit an identifier based on the QR code to the server, and the server may determine a database entry indicating a particular vehicle assigned to the identifier. A physical marker may be associated with a parking spot (e.g., one of parking spots 206A-206C), and the system may record what vehicle is in that parking spot. In some instances, the user may be able to confirm, using the mobile device, that the correct vehicle has been selected, and/or update the system with what vehicle is present if there is an error. The mobile device may take one or more images of the vehicle, which may be used (e.g., by the mobile device 302 or the server 352) to determine the vehicle via image processing. For example, a make, model, color, trim, and/or year of the vehicle may be determined using image processing. A particular vehicle may be determined by cross-referencing the image with a location of the user, as discussed in step 525.

At step 525, the system may determine a location of the user. A location sensor (e.g., location sensor 306 of a mobile device 302) may determine a location and transmit the location to the server. In some instances, there may be security concerns with remote access. For example, a parent could authorize a test drive for a child who is too young to test drive a vehicle. In another example, a malicious person could utilize stolen credentials to allow access to a vehicle from a foreign country. Thus, it may be advantageous to confirm a proximity between the user (e.g., using a recently authenticated mobile device 302) and the vehicle prior to unlocking. The system may determine a threshold proximity between the mobile device and the vehicle before allowing the vehicle to unlock. The location of the user may also be used to confirm that the intended vehicle is to be unlocked (e.g., by compiling a list of nearby vehicles to be cross-referenced against an image of a vehicle).

At step 530, the system may unlock the vehicle. If the system determines that the user is permitted to unlock the vehicle and/or is in proximity to the vehicle, the system may send a command to unlock the vehicle. The server may utilize a vehicle unlock interface (e.g., API 368) to send an unlock command (e.g., wirelessly or via a wired connection from communications interface 380 to communications interface 336) to a locking system (e.g., a locking system 340 of a vehicle 334). The vehicle may unlock in response to the command. In some instances, the locking system may be a locking system standard to that vehicle. In other instances, the locking system may be an aftermarket system installed on the vehicle. In some embodiments, the locking system may enable operation of the vehicle, such as by starting a vehicle and allowing it to be driven. In other instances, the locking system may unlock a vehicle and provide access to a key fob needed to start the vehicle. In yet other instances, the locking system may work in conjunction with other systems. For example, the locking system may provide the means of accessing the vehicle, but a smart key storage device (e.g., smart key storage device 364) for starting the vehicle may be inside or outside the vehicle, and may be accessed according to systems and methods described herein in order to access a key to start the vehicle.

At step 535, the system may detect the start of a test drive. The system may detect the start of the test drive based on movement information from the mobile device, such as by using information from an orientation sensor (e.g., orientation sensor 310) or a location sensor (e.g., location sensor 306). The system may detect the start of the test drive based on detecting a car has gone into drive using a parking sensor (e.g., parking sensor 346). The system may detect the start of the test drive based on detecting that the vehicle is in motion by following location information from the location sensor. The system may detect the start of a test drive based on a connection between two or more communication interfaces (e.g., between the communications interface 312 and the communications interface 336). For example, an application (e.g., application 316) of the mobile device may automatically trigger an attempted wireless connection (e.g., Bluetooth) to the vehicle when a test drive has been authorized. If a connection is connected, this may indicate that the mobile device is in close proximity to the vehicle.

At step 540, the system may track the test drive of the vehicle. In some instances, the system may use location information to determine a test drive is within parameters. For example, the system may limit the number of miles driven, limit the amount of time driven, confirm the user is driving the vehicle based on a proximity, confirm the vehicle stays within a certain proximity of a lot, and/or track that the test drive is safe for the vehicle. Vehicle safety may be confirmed using information from the vehicle. For example, the vehicle may report its speed (or report location information used to determine speed), may report any mechanical faults or signs of an accident, may report any unusual activity, or anything else that may indicate a dangerous use of the vehicle. The vehicle may utilize the communications interface to communicate the usage information (e.g., via LTE, 5G, Wi-Fi, Bluetooth tether to the mobile device, or using any other such connection). Vehicle safety may also be confirmed using information from the mobile device. The mobile device may report location information and/or speed information (e.g., based on a GPS or an accelerometer). The mobile device may determine if any signs of an accident have occurred. For example, the mobile device may report any sudden jolts using a solid-state gyroscope and/or an accelerometer. If the vehicle is determined to be outside certain parameters, the system may trigger a service as in step 560. A fine or penalty may be imposed on the user based on damage or wear to the vehicle. If vehicle usage is severely outside parameters, the vehicle may be restricted in speed, disabled after a delay, trigger an alert to a supervisor, or otherwise take action to ensure the safety the vehicle and its passengers.

At step 545, the system may detect that a vehicle has parked. The system may detect the end of the test drive based on movement information from the mobile device, such by using information from an orientation sensor (e.g., orientation sensor 310) or a location sensor (e.g., location sensor 306). For example, the system may determine that the mobile device has ceased high-speed motion after a period of time. In another example, the user interface of the mobile device may comprise a prompt for the user to indicate that the test drive has ended (e.g., a prompt may be displayed after the mobile device ceases high speed motion for a set period of time). The system may detect the end of the test drive based on detecting a car has parked using the parking sensor. For example, the system may detect that the vehicle has been shifted into park. In another example, the system may use an image sensor to detect a physical marker indicative of a parking space, and/or to detect a gear shift indicator signaling "park." The system may detect that the test drive has ended based on a disconnection between two or more communications interfaces (e.g., the mobile device disconnecting Bluetooth from the vehicle). The system may also verify that the test drive has ended by confirming that the location of the mobile device and/or the vehicle is at the location of a designated parking facility.

In some instances, the system may permit a user to purchase the vehicle after conducting a test drive. For example, after indicating that a drive has ended, a mobile device may prompt the user to purchase or lease the vehicle. The user may have the option to complete the transaction on the mobile device, may be directed to a website or representative to complete the transaction, and/or may be given the vehicle for an extended trial period (e.g., a 3-day trial upon receipt of a deposit). This may have the advantage of permitting a user to purchase a vehicle with little-to-no interaction with a human sales representative.

At step 550, the system may record usage information for the vehicle. Usage information may be useful both for maintenance and sales. For example, the vehicle may transmit its odometer reading, fuel levels, and other maintenance information. This may be used to determine service requests at step 560. In another example, the system may record which vehicles are driven, who drives them, and how they are driven. The system may have a user profile (e.g., a user profile 358) for the user who conducted the test drive, and may know the exact make and model of the vehicle driven. Thus, the system may be able to associate demographic information (e.g., age, gender, income level, cars owned, purchase trends, race, place of residence, etc.) with what vehicles are being test driven. The system may utilize this information to build a database indicating consumer preferences for various makes and model of vehicle according to each piece of demographic information. This may have the advantage of allowing for more effective advertising (e.g., by precisely tracking target demographics) and providing feedback for production decisions (e.g., by indicating which vehicles are being driven the most). For example, the system may determine that a particular vehicle is often test driven but rarely purchased, or that a certain demographic picks a first make of vehicle with a specific frequency over a second make of vehicle if they have test driven both.

At step 555, the system may record the vehicle location. Location information may be derived from the location sensor (e.g., location sensor 306 or location sensor 348). In some instances, particularized information for a parking spot (e.g., a parking spot 206A-206C) may be used to determine where a vehicle is parked. The user may use the mobile device to record a physical marker, such as discussed in step 515, to "check in" the vehicle at a given parking spot (which may or may not be where the same spot from where the vehicle was retrieved, and may even be a different lot). In some instances, the vehicle may determine where it is parked using an image sensor (e.g., image sensor 350) to record a physical marker, such as using one or more systems or methods as described herein.

At step 560, the system may send a service request for a vehicle. As described above, the system may record wear and tear that occurs during a test drive, and/or maintenance information (e.g., mileage and/or fuel usage). For example, the system may be programmed to send a request for a third-party service to fuel a given vehicle every set number of miles, based on the fuel efficiency of the vehicle. In another example, an employee may be summoned to inspect a vehicle if the test drive information indicated that the vehicle may have been driven roughly and suffered damage. The system may provide access for service using one or more methods or systems as described herein. For example, an individual servicing a vehicle may use a mobile device to take an image of a physical marker at the vehicle, which may trigger the server to unlock the vehicle (e.g., unlock a gas cap) for service. In another example, a vehicle inspector may use a mobile device to "check in" by taking a picture of the physical marker, and then use the mobile device to take images of the vehicle using the image sensor to verify that the vehicle is in good condition.

Figure 6:
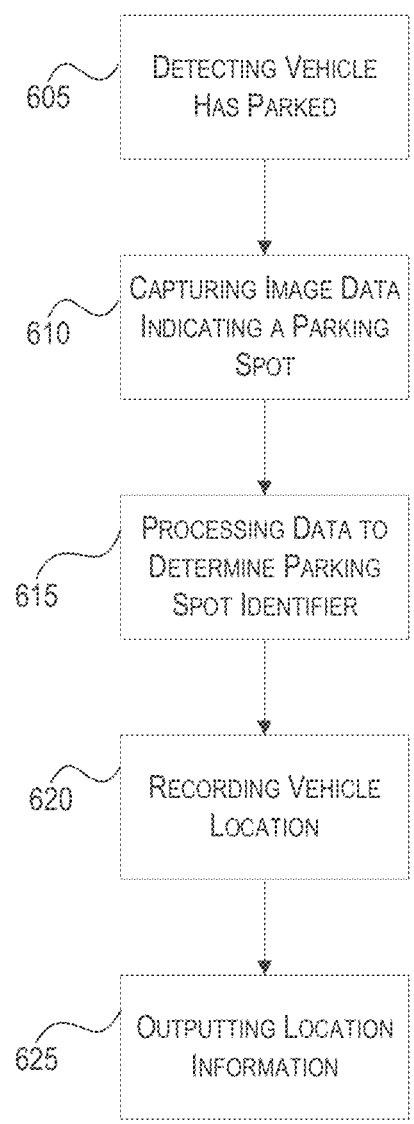
FIG. 6 depicts a flow diagram of an example method for an automated vehicle tracking system in accordance with one or more illustrative aspects discussed herein.

Having discussed a method for facilitating automated vehicle access as shown in FIG. 5, discussion will now turn to a method for an automated vehicle tracking system as shown in FIG. 6.

FIG. 6 illustrates an example method for an automated vehicle tracking system. Modern vehicles may employ imaging systems (e.g., image sensor 350). For example, an accident avoidance system and/or lane-keeping assistant system may employ one or more front-mounted cameras. In another example, a vehicle may employ one or more cameras to record video footage of a drive for insurance purposes (e.g., a dash cam). These imaging systems may be standard to a vehicle, aftermarket components for a vehicle, or may be modular units that may be moved between vehicles (e.g., a camera that may be mounted to a windshield with a suction cup). By utilizing a physical marker (e.g., physical marker 332) at a parking space, the vehicle may capture an image of the physical marker to determine where the vehicle is parked. The parking location may be sent to a server (e.g., server 352) and/or displayed to a user (e.g., using a mobile device, such as a mobile device 302, or a vehicle, such as a vehicle 334). The user may be a user 222.

At step 605, the system may determine that a vehicle has parked. The system may detect the end of the test drive based on movement information from the mobile device, such as an orientation sensor (e.g., orientation sensor 310) or a location sensor (e.g., location sensor 306). For example, the system may determine that the mobile device has ceased high-speed motion after a period of time. In another example, a user interface (e.g., user interface 314 of a mobile device 302) may comprise a prompt for the user to indicate that the test drive has ended (e.g., a prompt may be displayed after the mobile device ceases high speed motion for a set period of time). The system may detect the end of the test drive based on detecting a car has parked using a parking sensor (e.g., parking sensor 346). For example, the system may detect that the vehicle has been shifted into park. In another example, the system may use an image sensor (e.g., image sensor 350) to detect a physical marker (e.g., physical marker 332) indicative of a parking space, and/or to detect a gear shift indicator signaling "park." The system may detect that the vehicle is parked based on a disconnection between two or more communication interfaces a communications interface 312 and a communications interface 336 (e.g., the mobile device 302 disconnecting Bluetooth from the vehicle 334). The disconnection may indicate that a user has left the vehicle. The system may determine that a user has left the vehicle (and that the vehicle is parked) based on a location of the mobile device 302 moving away from the vehicle 334. In some instance, the system may determine or confirm that a vehicle is parked based on detecting a physical marker 332 associated with a parking space, such as discussed in step 610.

At step 610, the system may capture image data indicating a parking spot for a vehicle. An image sensor (e.g., image sensor 350) may detect an image of a physical marker (e.g., physical marker 332) indicating a parking spot. The physical marker may comprise a matrix barcode (e.g., QR code, AR code, etc.), as discussed above. For example, the image sensor may continuously scan (e.g., continually inspecting frames of a video feed) for a physical marker (e.g., a QR code). In another example, the image sensor may capture one or more images when the system determines that the vehicle has been parked, such as may be determined in step 605. The image may comprise a location tag in a predetermined zone of the image. For example, a physical marker may be placed at a specified height and location in a parking space, wherein the physical marker comprises a location tag (e.g., a QR code). If a location tag corresponding to a physical marker is detected in a predetermined zone of the image (e.g., the far right of the image) it may not be considered (e.g., a physical marker on the far right of an image may indicate passing a parking spot rather than parking in it). If the location tag corresponding to the physical marker is detected in the predetermined zone of the image (e.g., the center of the image at the specified height), this may indicate the vehicle is parked in front of the physical marker.

In some instances, a user may manually capture the image data. A mobile device (e.g., mobile device 302) may capture (e.g., using an image sensor 308), a physical marker corresponding to the vehicle (e.g., physical marker 332). The mobile device or vehicle may comprise a prompt wherein the user can request the mobile device or vehicle capture image data. A user may input a code (e.g., an alphanumeric code written on the physical marker 332) using the user interface (e.g., the user interface 314 or the user interface 338).

At step 615, the system may process the image data to determine a parking spot identifier. In some instances, a device capturing the image data (e.g., the vehicle) may process the image data and determine an identifier from the data. For example, the vehicle may detect a QR code, and determine an identifier from the QR code. In other instances, the image data may be transferred to another device for processing. For example, the vehicle may transfer image data to a server or a tethered mobile device (which may in turn send data to the server). The parking spot identifier (possibly along with an identifier of the vehicle) may be transmitted to the server.

At step 620, the system may record a location of the vehicle. After receiving and/or processing the parking spot identifier (and/or the identifier of the vehicle), the server may determine a database entry for the parking spot that corresponds to the parking spot identifier. The server may store information in the entry for the parking spot, such as an indicator of the vehicle 334 an indicator of the mobile device, and/or a user (which may be an indication of a user profile, such as a user profile 356). The server may alternatively, or in addition, store information in an entry for an associated user profile or vehicle profile (e.g., vehicle profile 358), such as a location (e.g., GPS coordinate) for the vehicle, a parking spot for the vehicle, etc.

At step 625, the system may output location information for display. The server may send parking spot information (e.g., an indicator of a parking space, such as a lot level and/or spot number) to the mobile device or vehicle. The mobile device or vehicle may display the parking spot information on its respective user interface (e.g., user interface 314 and/or user interface 338).

In some instances, the parking spot information may be displayed in response to a user request. A user may be walking to a vehicle and may wish to determine where his or her vehicle is parked. For example, a user may be returning from a long flight, and wish to locate a vehicle in an airport parking deck. In another example, a user may wish to locate a vehicle for rent, lease, or purchase in a retail lot. The user may use the mobile device to access the parking spot information (e.g., from the server) and display an indication of the parking spot on the user interface. In some instances, the parking spot information may be utilized with one or more systems described herein. For example, the parking spot information may indicate a location of a vehicle for rent or purchase as described in FIG. 4 or FIG. 5. In another example, the parking spot information may be used in conjunction with a directional marker or AR marker to direct a user to a vehicle, such as described in FIG. 7 or FIG. 8.

Figure 7:
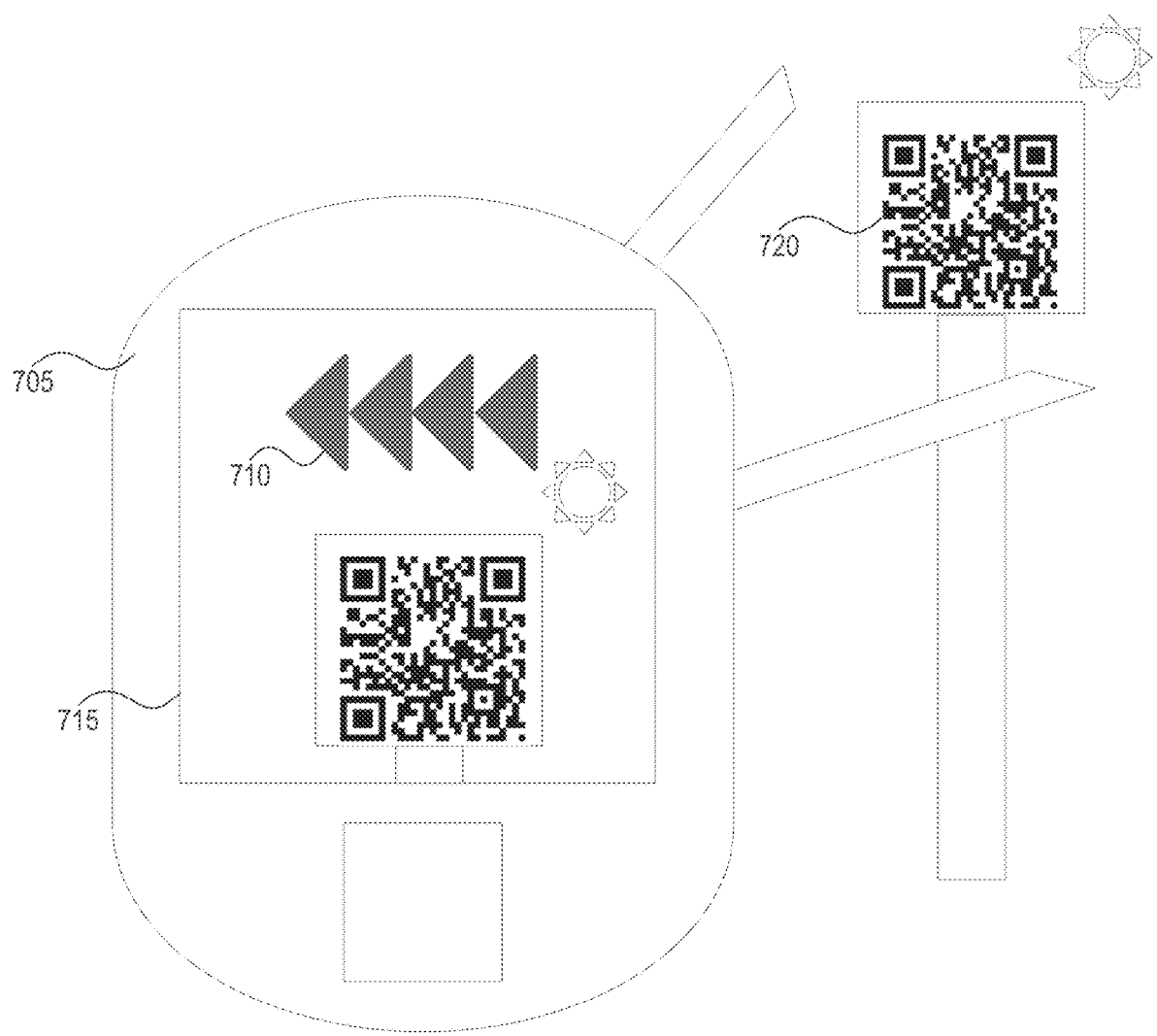
FIG. 7 depicts an example system for displaying an augmented reality (AR) indicator to direct a user to a destination in accordance with one or more illustrative aspects discussed herein.
Figure 8:
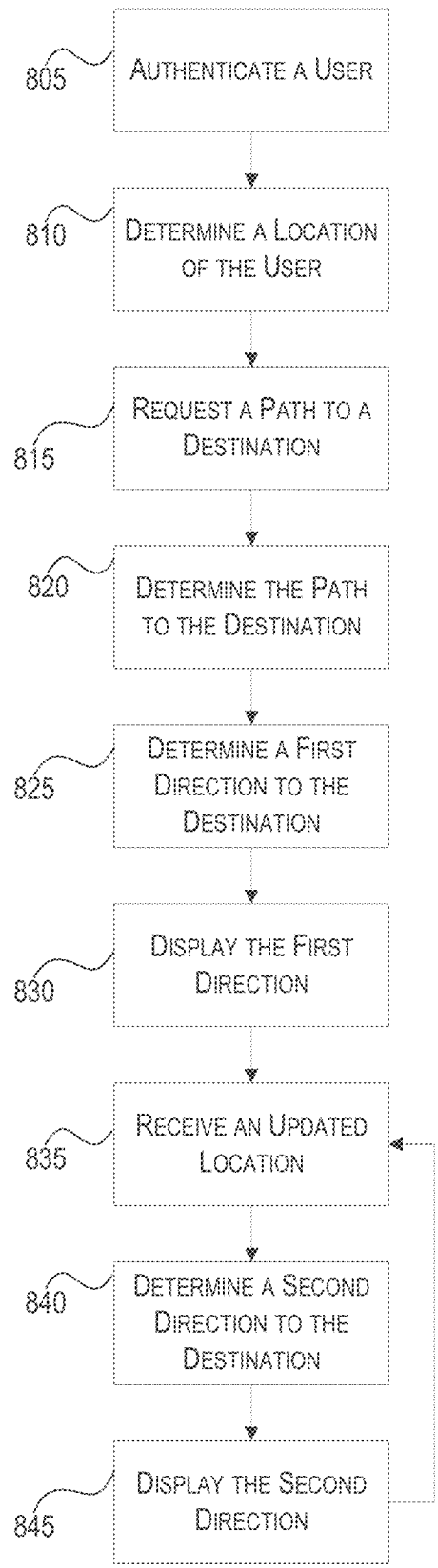
FIG. 8 depicts a flow diagram of an example method for displaying an AR indicator to direct a user to a destination in accordance with one or more illustrative aspects discussed herein.

Having discussed a method for an automated vehicle tracking system as shown in FIG. 6, discussion will now turn to systems and methods for displaying one or more augmented reality directions as shown in FIG. 7 and FIG. 8.

FIG. 7 illustrates an example system for displaying an augmented reality (AR) indicator to direct a user (e.g., a user 222) to a destination. A device 705, which may be a mobile device 302, may be used to display (e.g., on a display screen 715) an indicator 710 that directs a user to a destination. While the device 705 is depicted as a mobile phone, the device 705 may be any mobile device, such as AR glasses, a tablet, etc. The destination may be any location, such as a location of a product in a store, a vehicle in a parking lot, or an exit from a building. For example, the destination may be the location of a vehicle, which may be received from a server (e.g., server 352). The device 705 may use an orientation sensor 310 and/or a location sensor 306 to determine the orientation of the indicator 710. For example, the device 705 may determine the relative location of a vehicle based on the location of the vehicle received from the server, a location of the device 705 derived from location sensor 306, and/or an orientation of the device 705 (e.g., a cardinal direction, angle, pitch, etc.) from an orientation sensor (e.g., orientation sensor 310).

In some instances, a physical marker 720 (e.g., QR code, AR code, etc.), which may be a physical marker 332, may be utilized to provide direction to the destination. The device 705 may scan the physical marker 720 to determine a location of the device 705. For example, an application (e.g., application 316) may determine a location of the device 705 based on detecting that it is in proximity to the physical marker 720. In another example, the device 705 may transmit information derived from the physical marker 720 to a server, which may return a location of the device 705. In this manner, a confirmed and/or predetermined location of the device 705 may be determined. For example, one or more predetermined paths may be created from the physical marker 720 to one or more destinations (e.g., vehicle parking spaces). The predetermined paths may be created manually or automatically. Upon scanning the physical marker 720, the device 705 may begin showing the path to the destination. The physical marker 720 may also be used to confirm orientation and location relative to the path. For example, a device 705 may be in an underground garage where location information (e.g., GPS data) or orientation information (e.g., a direction) may be limited or unavailable. The orientation of the physical marker 720 in real space may be known, such as knowing that the physical marker 720 is flat against a wall running east to west at a particular location. The device 705 may thus orient an indicator 710 based upon the known relative location and/or orientation of the physical marker 720. For example, if a parking spot is known to be one floor above a physical marker 720, a device 705 detecting a physical marker 720 in a stairwell may display an indicator 710 pointing up a flight of stairs. More than one indicator 720 may be used in succession. For example, a device 705 may capture physical markers 720 at multiple points in a parking garage, each providing an indicator 710 directing a next step in a path. Each step of the path may direct the device 705 to another physical marker 720 in succession, such that a user can follow physical markers until a destination is reached.

The indicator 710 may be displayed using an overlay on the display screen 715. The device 705 may capture image data (which may be a live video feed) of the environment. the indicator 710 may be overlaid onto the image data for display in order to provide an augmented reality (AR) experience. The indicator may comprise an augmented reality direction. For example, the indicator 710 may be displayed as a two-dimensional or three-dimensional indicator overlaid on a video feed, wherein the indicator may indicate a direction. The indicator 710 may be relative to the environment. The device 705 may comprise an orientation sensor, such as a solid-state gyroscope and/or orientation sensor 310. The indicator 710 may be displayed based on an orientation received from the orientation sensor. For example, the indicator 710 may be adjusted in any direction to compensate for the orientation of the device. This may have the advantage of providing an accurate indicator 710 for a mobile device 705 that may be held at multiple angles. The indicator 710 may be a three-dimensional indicator 710, which may be overlaid such that the indicator 710 appears to "float" in the environment as a directional symbol pointing in three dimensions to a destination and/or providing the next direction for a path. This may provide the user with an AR experience with which the user may perceive directions relative to their environment in multiple dimensions.

FIG. 8 illustrates an example method for displaying an AR indicator to direct a user (e.g., a user 222) to a destination. A device (e.g., device 705) may display one or more AR indicators (e.g., AR indicators 710) to the user, wherein each AR indicator directs a user to a destination location (e.g., via one or more directions down a path). A system may facilitate determining a location of the device, the destination for the path, the path, and the one or more directions, such as described herein.

At step 805, the system may authenticate a user. The user may be a user who is utilizing a device (e.g., a device 705). For example, the user may have requested directions to a parked vehicle (e.g., a vehicle 334). The user may access an application (e.g., application 316), and request directions to a destination using a user interface (e.g., user interface 314). For example, the user may request directions to his or her vehicle. In another example, the user may request directions to a vehicle for rent or purchase. In yet another example, the user may request directions to a goods for sale at a retail location. Authentication information (e.g., a password, a fingerprint, or any other information that may be used to verify the identity of the user) may be received by the device, processed, and sent to a server (e.g., server 352). The authentication information may be used to confirm who the user is, what information is associated with the user, and/or that the user is permitted access to the directions. For example, a user profile (e.g., user profile 356) may indicate that a particular user owns a particular vehicle located at a particular destination (e.g., a destination associated with a parking spot, such as parking spot 362). Directions to a particular destination may be conditioned on access. For example, a user may be given directions only to a vehicle they own, or to a vehicle they are permitted to rent or purchase. In some instances, directions may be in response to a user being given access. For example, a user may rent or purchase a good (e.g., a vehicle) using the user interface, and the user may be supplied directions to the good (e.g., directions to a parking spot of the vehicle) in return.

At step 810, the system may determine a location of the user. The device may determine a location based on feedback from a location sensor (e.g., location sensor 306). For example, the device may determine a location based on GPS data. The system may, alternatively or in addition, determine a location based on a physical marker (e.g., physical marker 720). The device may capture an image of the physical marker to determine a location (e.g., as discussed in FIG. 7). The physical marker may be placed at a known location (e.g., a stairwell, a branch in a pathway, an entrance, an exit, etc.). An association between the physical marker may be stored in an application (e.g., application 316) and/or in a database (e.g., database 354). If the device scans the physical marker, the system may determine that the device is at the known location.

At step 815, a request may be made for a path to a destination. The device may request a path to a destination. The path may be stored on the device and/or at the server. For example, the device may transmit, to the server, a request for a path to the destination. The destination may be obtained via an interface of the device, such as a user interface (e.g., user interface 314). The destination may be determined according one or more systems or methods described herein. For example, a parked location of a vehicle may be recorded as in FIG. 6. The user may request directions to the vehicle, and the server may determine the destination based on the parked location of the vehicle. In another example, the user may request to see a vehicle for purchase as in FIG. 4 or FIG. 5, and the server may determine a destination based on a parking spot system associated with the vehicle (e.g., parking spot system 318).

At step 820, a path to the destination may be determined. A path may comprise one or more directions from the device to the destination. The one or more directions may comprise one or more directional indicators (e.g., directional indicators 710). A path may be a route between the location of the device to the destination. The path may be determined based on shortest navigable distance between the device and the destination. For example, the path may comprise a first direction to proceed to a row of vehicles in a parking lot, a second direction to turn at the row, and a third direction pointing to a destination vehicle. The path may be partially or fully predetermined. For example, one or more physical markers may be placed around an area. Predetermined paths may be created to travel between the physical markers. If a device at a first physical marker requests a path to a destination, the system may determine a predetermined path from the first physical marker to a second physical marker closest to the destination. The device may follow the path until the second physical marker, at which point the device may point to the destination.

At step 825, a first direction for the path may be determined. The system may determine the first direction based on the location of the device and the path, such as may be described above regarding step 820. Paths and/or directions may be determined locally and/or remotely. A device may locally determine a path from the device to the destination (e.g., using a mapping application, such as Google Maps, on the device). A device may transmit a request for a path to a server, and the server may determine the path and transmit the path and/or directions to the device. For example, the server may receive a request for a path, determine a full path (e.g., a series of one or more directions) from the location of the device and the destination, and transmit the full path in one continuous transmission. In another example, the server may receive a request for a path, and transmit a first direction to the location. The server may then repeatedly receive updated locations from the device and transmit a new direction to the destination (from the respective updated location) after each location update. The device may also receive a plurality of directions to the destination initially, may transmit location updates intermittently, and may rely on the initial directions until and/or unless updated directions are received. This may have the advantage of assisting with communication lapses, as may happen in an underground garage.

At step 830, the first direction may be displayed. The first direction may comprise an indicator (e.g., indicator 710) displayed on the device. The indicator may be displayed as discussed in FIG. 7. For example, the indicator may be overlaid upon an environment to supply a first direction down a path and/or to a destination.

At step 835, a location update may be received. The device may determine a new location using one or more systems or methods as described herein. For example, the device may determine an updated location based on GPS data. In another example, the device may encounter an additional physical marker, which may be used to generate an updated location corresponding to the additional physical marker. The location update may be sent from the device to the server.

At step 840, a second direction for the path may be determined based on the updated location. If the updated location is a point along a path, the second direction may comprise a second direction for the path. The updated location may be a deviation from a previously defined path, so the system determine a new path (e.g., using the updated location as the location and repeating steps 810 to 820). In some instances, a user may be directed to proceed down a path with multiple physical markers (e.g., a plurality of physical markers 720), as discussed herein. The directions may indicate that the user should scan an additional physical marker. When a user reaches each additional physical marker, he or she may be asked to scan the marker. The system may determine the new location based on the scan of the additional physical marker, and display a new direction from that additional physical marker (e.g., based on a known position of the additional physical marker). For example, a path to a hospital room may comprise physical markers that sequentially direct a user to given ward along a predefined path, and the system may generate directions to a particular room once in the correct hallway. In another example, a path to a product in a retail building (e.g., a grocer) may direct a user down a predetermined path to the correct aisle or bay, and then may direct the user to a requested product when the user is in the correct aisle.

At step 845, the second direction may be displayed. The second direction may comprise an indicator (e.g., indicator 710) displayed on the device. The indicator may be displayed as discussed in FIG. 7. For example, the indicator may be overlaid upon an environment to supply a second direction down a path and/or to a destination. Steps 835 to 845 may be repeated until the system determines that the device is at the destination. The destination (e.g., a vehicle) may be indicated using an augmented reality marker overlaid on a display such as display 715 (e.g., an indicator arrow pointing to the vehicle, or a symbol representing a vehicle).

One or more aspects described herein may provide automated systems for tracking, locating, and/or accessing vehicles. This may have the benefit of reducing the manpower needed to store, sell, lease, or rent vehicles, while reducing the strain on the consumer. For example, a consumer may be able to quickly locate and access a vehicle for a test drive using a mobile application, which may have the advantage of allowing a user to avoid a pushy salesperson (which may also reduce overhead for a car dealer). The system may also have the advantage of allowing a car dealer or financier track inventory and the condition of that inventory. This may promote more efficient sales due to reduced friction for the consumer and reduced costs for the retailer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claims is:

1. A computing device comprising:
a wireless transceiver;
one or more processors; and
memory storing instructions that, when executed by the one or more processors, cause the computing device to:
receive an indication from a parking sensor associated with a vehicle that the vehicle has shifted into park;
capture, in response to receiving the indication and by an image sensor, first data indicating a first physical marker;
send, by the wireless transceiver and based on detecting the first data, the first data to a server, wherein the first data causes the server to store location information determined based on the first data, and wherein the location information corresponds to the vehicle;
send, by the wireless transceiver, to the server, and based on a user input requesting the location information, a request to retrieve the location information; and
receive, from the server, by the wireless transceiver, and in response to the request, the location information.

2. The computing device of claim 1, wherein the first physical marker comprises a QR code.

3. The computing device of claim 2, wherein the first data comprises image data corresponding to the QR code.

4. The computing device of claim 1, wherein the parking sensor comprises an accelerometer.

5. The computing device of claim 1, wherein the instructions, when executed by the one or more processors, cause the computing device to validate the first data by determining that the first data comprises a location tag in a predetermined zone of an image.

6. The computing device of claim 1, wherein the instructions, when executed by the one or more processors, cause the computing device to capture and send the first data based on determining, by the computing device, that a video stream captured by the image sensor comprises an instance of a QR code.

7. The computing device of claim 1, wherein the computing device comprises a cellular transceiver.

8. The computing device of claim 1, wherein the computing device comprises a Bluetooth™ transceiver, and wherein the instructions, when executed by the one or more processors, cause the computing device to send, via the Bluetooth™ transceiver, the location information to the vehicle.

9. The computing device of claim 1, wherein the vehicle comprises the computing device.

10. The computing device of claim 1, wherein the computing device comprises a display, and wherein the instructions, when executed by the one or more processors, cause the computing device to display the location information on the display.

11. A method comprising:
receiving, by a computing device, an indication from a parking sensor of a vehicle that the vehicle has shifted into park;
capturing, in response to receiving the indication and by an image sensor, an image;
determining, by the computing device, that the image comprises first data corresponding to a first physical marker;
sending, by the computing device and based on the determining, the first data to a server, wherein the first data causes the server to store location information determined based on the first data, and wherein the location information corresponds to the vehicle;
sending, by the computing device, to the server, and based on a user input, a request to retrieve the location information; and
receiving, from the server, by the computing device, and in response to the request, the location information.

12. The method of claim 11, wherein the first physical marker comprises a QR code.

13. The method of claim 12, wherein the first data comprises an image of the QR code.

14. The method of claim 13, wherein the parking sensor comprises an accelerometer.

15. The method of claim 11, wherein determining that the image comprises first data comprises determining that the image comprises a location tag in a predetermined zone of the image.

16. The method of claim 15, wherein the location tag comprises a QR code.

17. The method of claim 11, wherein the computing device comprises a cellular transceiver.

18. The method of claim 11, wherein the computing device comprises a Bluetooth™ transceiver, and further comprising sending, via the Bluetooth™ transceiver, the location information to the vehicle.

19. The method of claim 11, further comprising causing, by the computing device, output of the location information for display to a user.

20. One or more non-transitory media storing instructions that, when executed by one or more processors, cause the one or more processors to perform steps comprising:
detecting, based on feedback from a parking sensor of a vehicle, that the vehicle has shifted into park;
capturing, by an image sensor and in response to the detecting, an image;
determining, based on detecting that the image comprises a QR code, first data corresponding to the QR code;
sending, based on the determining, the first data to a server, wherein the first data causes the server to store location information determined based on the first data, and wherein the location information corresponds to the vehicle;
sending, to the server and based on a user input, a request to retrieve the location information;
receiving, from the server and in response to the request, the location information corresponding to the QR code; and
displaying the location information on a display screen.

* * * * *